United States Patent
Takada et al.

(10) Patent No.: US 8,285,943 B2
(45) Date of Patent: Oct. 9, 2012

(54) STORAGE CONTROL APPARATUS AND METHOD OF CONTROLLING STORAGE CONTROL APPARATUS

(75) Inventors: Ryu Takada, Odawara (JP); Yasuhiko Yamaguchi, Hiratsuka (JP); Ran Ogata, Odawara (JP)

(73) Assignee: Hitachi, Ltd., Tokyo (JP)

( * ) Notice: Subject to any disclaimer, the term of this patent is extended or adjusted under 35 U.S.C. 154(b) by 442 days.

(21) Appl. No.: 12/526,409

(22) PCT Filed: Jun. 18, 2009

(86) PCT No.: PCT/JP2009/002776
§ 371 (c)(1),
(2), (4) Date: Aug. 7, 2009

(87) PCT Pub. No.: WO2010/146629
PCT Pub. Date: Dec. 23, 2010

(65) Prior Publication Data
US 2011/0167232 A1    Jul. 7, 2011

(51) Int. Cl.
*G06F 12/00* (2006.01)

(52) U.S. Cl. .................................. 711/147; 711/148
(58) Field of Classification Search .................. 711/147, 711/148
See application file for complete search history.

(56) References Cited

U.S. PATENT DOCUMENTS

| | | |
|---|---|---|
| 2004/0143829 A1 | 7/2004 | Uchiumi et al. |
| 2006/0236052 A1 | 10/2006 | Minowa |
| 2008/0301385 A1 | 12/2008 | Nagata et al. |

FOREIGN PATENT DOCUMENTS

| | | |
|---|---|---|
| EP | 1 708 077 A1 | 10/2006 |
| EP | 1 821 188 A2 | 8/2007 |
| EP | 1 986 090 A2 | 10/2008 |
| JP | 2006-285778 A | 10/2006 |

*Primary Examiner* — Yaima Campos
*Assistant Examiner* — Hamdy S Ahmed
(74) *Attorney, Agent, or Firm* — Mattingly & Malur, P.C.

(57) ABSTRACT

The storage control apparatus arranges, in microprocessor packages, management information relating to logical volumes managed by the microprocessor packages. In a predetermined case, each of the management information is rearranged in appropriate places. The management information can be moved, taking into account the difference in the technical properties between a mainframe and an open system host.

13 Claims, 28 Drawing Sheets

| LDEV # | RAID GROUP# | RAID CONFIGURATION | SIZE | TYPE | ... |
|---|---|---|---|---|---|
| | C301 | C302 | C303 | C304 | |
| 0001 | 01 | RAID5(3D+1P) | 1TB | SATA | ... |
| 0002 | 02 | RAID6(6D+2P) | 2TB | SAS | ... |
| 0003 | 03 | RAID1(1D+1D) | 500MB | FM | ... |
| ... | ... | ... | ... | ... | ... |

VOLUME CONFIGURATION INFORMATION

| | | T33 MANAGEMENT TABLE FOR DETERMINING MPPK THAT PERFORMS SUBSTITUTION ON THE OCCURRENCE OF FAILURE | | |
|---|---|---|---|---|
| C330 TARGET MPPK# | C331 SUBSTITUTION FIRST CANDIDATE | C332 SUBSTITUTION SECOND CANDIDATE | C333 SUBSTITUTION THIRD CANDIDATE | |
| #0 | #2 | #3 | #1 | |
| #1 | #3 | #2 | #0 | |
| #2 | #0 | #1 | #3 | |
| #3 | #1 | #0 | #2 | |

STORAGE CONTROL APPARATUS AND METHOD OF CONTROLLING STORAGE CONTROL APPARATUS

TECHNICAL FIELD

The present invention relates to a storage control apparatus and a method of controlling the storage control apparatus.

BACKGROUND ART

A storage control apparatus uses a plurality of storage units, such as a hard disk drive, to provide a host computer with a storage area based on RAID (Redundant Arrays of Inexpensive Disks). The storage control apparatus has a plurality of microprocessors. The microprocessors share volume configuration information stored in shared memory. It takes a long processing time for each microprocessor to directly access the shared memory to use the volume configuration information. Therefore, a configuration is proposed in which a part of the shared volume configuration information is copied to a local memory disposed in the vicinity of the microprocessors.
[PTL 1]
JP-A-2006-285778

DISCLOSURE OF INVENTION

Technical Problem

In conventional technology, because the volume configuration information is disposed within the local memory positioned in the vicinity of the microprocessors, the processing performance can be enhanced by reducing the time to access the volume configuration information. However, when, for example, copy processing is performed between a plurality of logical volumes, it is necessary to dispose the volume configuration information relating to a copy source volume and the volume configuration information relating to a copy destination volume, in the local memory that is used by a microprocessor in charge of the copy processing.

When the volume configuration information relating to the copy source volume and the volume configuration information relating to the copy destination volume are arranged in separate local memories and the copy processing is performed by separate microprocessors referring to these local memories, access to the shared memory is generated, which requires a long time for the copy processing to be performed, whereby the performance thereof is degraded.

In a predetermined case, as described above, it is necessary to rearrange the volume configuration information stored in each local memory. In the patent literature described above, however, rearrangement of the volume configuration information is not considered. Further, the patent literature does not describe a configuration for rearranging the volume configuration information without stopping the access from the host computer.

An object of the present invention is, therefore, to provide a storage control apparatus and a method of controlling the storage control apparatus that are capable of appropriately rearranging the volume configuration information stored in each local memory. Another object of the present invention is to provide a storage control apparatus and a method for controlling the storage control apparatus that are capable of rearranging the volume configuration information stored in each local memory in appropriate timing, without stopping access from a host computer. Yet other objects of the present invention will become apparent from the following description of embodiments.

Solution to Problem

In order to achieve the above objects, a storage control apparatus according to a first aspect of the present invention is a storage control apparatus for controlling data input/output between a host computer and a storage unit, the storage control apparatus having: a first communication part for communicating with the host computer and storing an allocation table for allocating commands issued by the host computer; a second communication part for communicating with the storage unit; a plurality of microprocessors for controlling the data input/output between the host computer and the storage unit by using the first communication part and the second communication part; a shared memory used by each of the microprocessors; and a plurality of local memories arranged for the microprocessors respectively, wherein the shared memory stores first volume configuration information for managing a plurality of logical volumes, each of the local memories stores second volume configuration information, which is a copy of information, from among the first volume configuration information, that relates to a management target logical volume managed by the microprocessor corresponding to the local memory, and the second volume configuration information stored in the local memory which serves as a source local memory is moved to a destination local memory, when a predetermined condition is satisfied.

In a second aspect, according to the first aspect, each of the microprocessors is contained in any of a plurality of microprocessor packages, each of which has a group of the microprocessors, each of the microprocessor packages has a first microprocessor for processing the commands issued by the host computer, and a second microprocessor in charge of processing different from the command processing, the microprocessors contained in a common microprocessor package share the local memories within the microprocessor package, the shared memory stores, beforehand, first use authority information representing authority to use each of the logical volumes, in the first use authority information, reception authority information representing authority to receive the commands relating to the logical volumes and execution authority information representing authority to process the commands using the logical volumes are associated with each other for each of the logical volumes beforehand, each of the local memories stores second use authority information, which is a copy of the first use authority information, the allocation table stores a copy of the reception authority information, from among the first use authority information, which relates to each of the logical volumes, (1) when the predetermined condition is established, the second microprocessor within a predetermined microprocessor package out of the microprocessor packages (1-1) switches the reception authority information relating to a movement target logical volume out of the reception authority information stored in the allocation table, from a microprocessor package serving as a movement source to a microprocessor package serving as a movement destination, in order to update the allocation table, (1-2) switches the reception authority information, of the first use authority information, that relates to the movement target logical volume, from the microprocessor package serving as a movement source to the destination microprocessor package to update the first use authority information, and (1-3) conforms the second use authority information to the updated first use authority information, (2) a first communication controller transmits the commands issued by the host computer to the microprocessor package serving as a movement destination based on the updated allocation table, (3) the microprocessor package serving as a movement source (3-1) transfers a command extracted from a queue for accumulating unprocessed commands to the microprocessor package serving as a movement destination when the reception authority information is already moved to the microprocessor package serving as a movement destination, (3-2) moves the execution authority information to the microprocessor package serving as a movement destination when all of commands in process are lost, and (3-3) deletes the second volume configuration information corresponding to the movement target logical volume from the local memories within the microprocessor package serving as a movement source, (4) the microprocessor package serving as a movement destination (4-1) accumulates commands to be received from the first communication part or the microprocessor package serving as a movement source as commands to be processed until the execution authority information is acquired from the microprocessor package serving as a movement source, (4-2) stores the second volume configuration information relating to the movement target logical volume, into the local memories on the basis of the first volume configuration information within the shared memory, when the execution authority information is acquired from the microprocessor package serving as a movement source, and (4-3) processes the commands to be processed, by using the second volume configuration information, and, (5) in a case in which the host computer corresponding to the microprocessor package serving as a movement source is a mainframe, (5-1) either when the execution authority information is already moved to the microprocessor package serving as a movement destination or when a predetermined time period that is set for moving the execution authority information to the microprocessor package serving as a movement destination elapses, (5-2) processing of the command extracted from the queue for accumulating the unprocessed commands is suspended, and a request for reissuance of this process-suspended command is sent to the host computer.

In a third aspect, according to the first aspect, use authority information representing authority to use each of the logical volumes is stored in each of the local memories beforehand, in the use authority information, reception authority information representing authority to receive the commands relating to the logical volumes and the execution authority information representing the authority to process the commands using the logical volumes are associated with each other for each of the logical volumes beforehand, when the predetermined condition is satisfied, first, the reception authority information relating to the movement target logical volume is associated with a microprocessor serving as a movement destination, and then the execution authority information relating to the movement target logical volume is associated with the microprocessor serving as a movement destination, whereby the second volume configuration information relating to the movement target logical volume is moved to the local memory used by the microprocessor serving as a movement destination.

In a fourth aspect, according to the first aspect, the shared memory stores, beforehand, first use authority information representing authority to use each of the logical volumes, in the first use authority information, reception authority information representing authority to receive the commands relating to the logical volumes and execution authority information representing authority to process the commands using the logical volumes are associated with each other for each of the logical volumes beforehand, each of the local memories stores second use authority information, which is a copy of the first use authority information, the allocation table stores a copy of the reception authority information, from among the first use authority information, which relates to each of the logical volumes, (1) when the predetermined condition is established, a predetermined microprocessor out of the microprocessors (1-1) switches the reception authority information relating to the movement target logical volume out of the reception authority information stored in the allocation table, from a microprocessor serving as a movement source to a microprocessor serving as a movement destination, in order to update the allocation table, (1-2) in the first use authority information, switches the reception authority information relating to the movement target logical volume, from the microprocessor serving as a movement source to the microprocessor serving as a movement destination, in order to update the first use authority information, and (1-3) conforms the second use authority information to the updated first use authority information, (2) a first communication controller transmits the commands issued by the host computer to the microprocessor serving as a movement destination based on the updated allocation table, (3) the microprocessor serving as a movement source (3-1) transfers unprocessed commands to the microprocessor serving as a movement destination when the reception authority information is already moved to the microprocessor serving as a movement destination, (3-2) moves the execution authority information to the microprocessor serving as a movement destination when all of commands in process are lost, and (3-3) deletes the second volume configuration information corresponding to the movement target logical volume from the local memory used by the microprocessor serving as a movement source, (4) the microprocessor serving as a movement destination (4-1) accumulates commands to be received from the first communication part or the microprocessor serving as a movement source, until the execution authority information is acquired from the microprocessor serving as a movement source, (4-2) stores the second volume configuration information relating to the movement target logical volume, into the local memories on the basis of the first volume configuration information within the shared memory, when the execution authority information is acquired from the microprocessor serving as a movement source, and (4-3) processes the commands to be processed, by using the second volume configuration information.

In a fifth aspect, according to the fourth aspect, (5) in a case in which the host computer corresponding to the microprocessor serving as a movement source is a mainframe, (5-1) either when the execution authority information is already moved to the microprocessor serving as a movement destination or when a predetermined time period that is set for moving the execution authority information to the microprocessor serving as a movement destination elapses, (5-2) the microprocessor serving as a movement source receives the reception authority information prior to the movement thereof to the microprocessor serving as a movement destination, suspends the processing of the unprocessed commands, and requests the host computer to reissue the process-suspended commands.

In a sixth aspect, according to the first aspect, each of the microprocessors is contained in any of a plurality of microprocessor packages, each of which has a group of the microprocessors, each of the microprocessor packages has a first microprocessor for processing the commands issued by the host computer, and a second microprocessor in charge of processing different from the processing of the commands, the microprocessors contained in the common microprocessor package share the local memories within the microprocessor package, and the second microprocessor within a predetermined microprocessor package out of the microprocessor packages moves the second volume configuration information stored in the local memory serving as a movement source to the local memory serving as a movement destination, when the predetermined condition is satisfied.

In a seventh aspect, according to the sixth aspect, the number of the first microprocessors is increased in accordance with the number of commands to be processed.

In an eighth aspect, according to the seventh aspect, when the number of the first microprocessors reaches a predetermined upper limit value, the second microprocessor is changed to a third microprocessor capable of performing both the command processing and different processing.

In a ninth aspect, according to the first aspect, a case where the predetermined condition is satisfied means at least one of when a copy pair is generated; when a failure occurs in any of the microprocessors; and when load is distributed among the microprocessors.

In a tenth aspect, according to the first aspect, a case where the predetermined condition is satisfied means that a copy pair is generated using any plurality of the logical volumes, and the second volume configuration information is moved from the local memory corresponding to one logical volume of the copy pair to the local memory corresponding to the other logical volume of the copy pair, such that the second volume configuration information relating to the one logical volume and the second volume configuration information relating to the other logical volume exist within the same local memory.

In an eleventh aspect, according to the first aspect, a case where the predetermined condition is satisfied means that a failure occurs in any of the microprocessors, and the second volume configuration information relating to the logical volume managed by the microprocessor having the failure is moved to the local memory associated with the microprocessor for performing processing on behalf of the microprocessor having the failure.

In a twelfth aspect, according to the first aspect, a case where the predetermined condition is satisfied means that load is distributed among the microprocessors, and the second volume configuration information is moved from a high-load microprocessor having a load of at least a predetermined value to a low-load microprocessor having a load of less than the predetermined value.

A method of controlling a storage control apparatus according to a thirteenth aspect is a method of controlling a storage control apparatus controlling data input/output between a host computer and a storage unit, the storage control apparatus having: a first communication part for communicating with the host computer and storing an allocation table for allocating commands issued by the host computer; a second communication part for communicating with the storage unit; a plurality of microprocessors for controlling the data input/output between the host computer and the storage unit by using the first communication part and the second communication part; a shared memory used by each of the microprocessors and storing at least first volume configuration information for managing a plurality of logical volumes; and a plurality of local memories arranged in the microprocessors respectively, wherein each of the local memory stores second volume configuration information, which is a copy of information, from among the first volume configuration information, that relates to a management target logical volume managed by the microprocessor corresponding to the local memory, each of the local memories further stores, beforehand, use authority information representing authority to use each of the logical volumes, in the use authority information, reception authority information representing authority to receive the commands relating to the logical volumes and execution authority information representing authority to process the commands using the logical volumes are associated with each other for each of the logical volumes beforehand, and wherein the method comprises: determining whether a predetermined condition is satisfied or not; associating the reception authority information relating to a movement target logical volume with a microprocessor serving as a movement destination and associating the execution authority information relating to the movement target logical volume with the microprocessor serving as a movement destination, when the predetermined condition is satisfied; deleting the second volume configuration information relating to the movement target logical volume, from the local memory used by a microprocessor serving as a movement source of the execution authority information; and copying the second volume configuration information relating to the movement target logical volume, from the shared memory to the local memory used by the microprocessor serving as a movement destination of the execution authority information.

The constituents, steps or means of the present invention might be generated as computer programs. These computer programs can be distributed via a communication network or a recording medium. In addition, various aspects of the present invention other than those described above can be combined. These combinations are also included within the scope of the present invention.

BRIEF DESCRIPTION OF DRAWINGS

FIG. 7 A diagram showing information for managing a configuration of logical volumes.

FIG. 24 A diagram showing a table for managing the priority order of the substituting microprocessor packages.

REFERENCE SIGNS LIST

Figure 1:
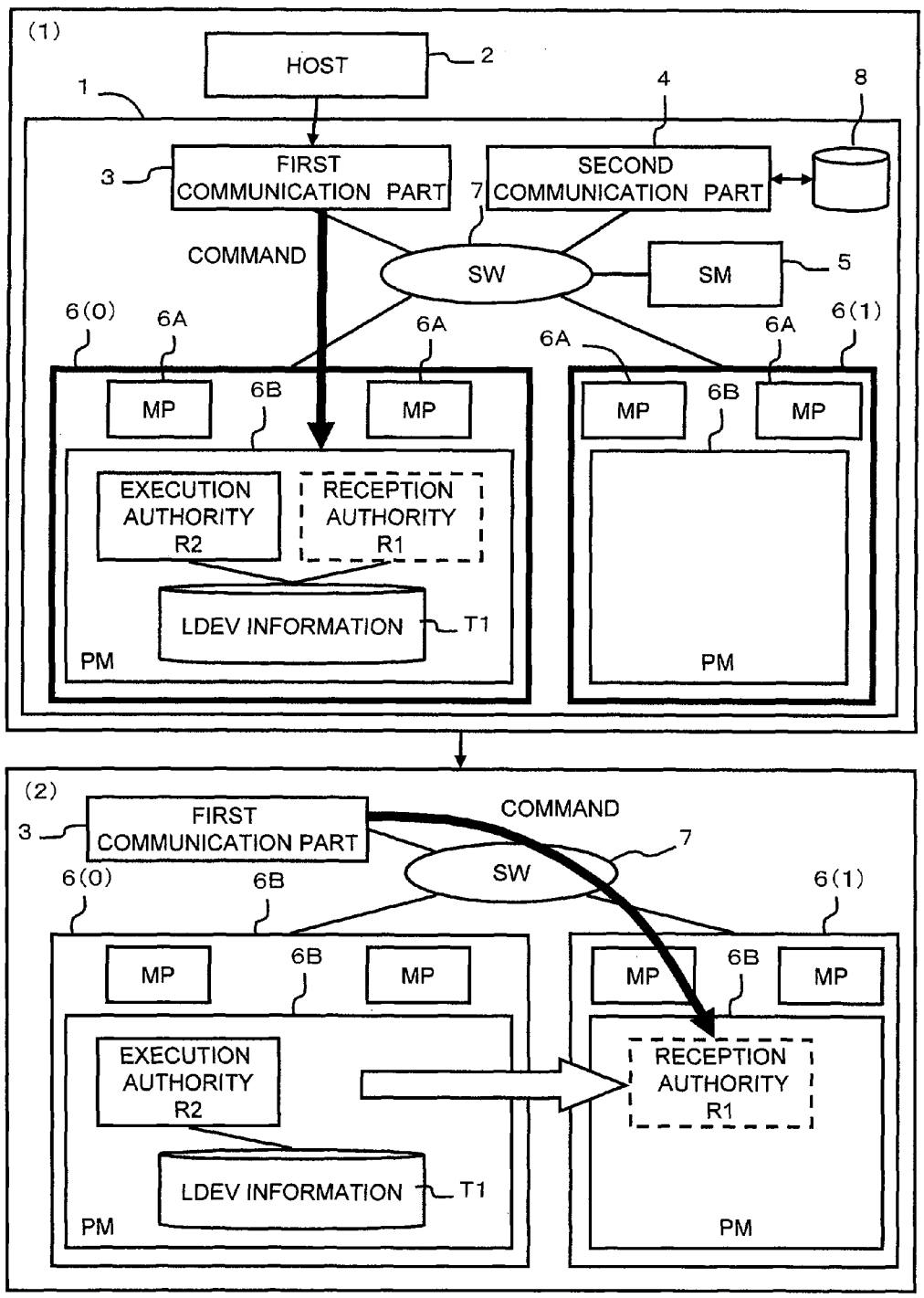
FIG. 1 A schematic diagram showing embodiments of the present invention.

1 . . . Storage control apparatus
2 . . . Host computer
3 . . . First communication part
4 . . . Second communication part
5 . . . Shared memory
6 . . . Microprocessor package
6A . . . Microprocessor
6B . . . Package memory
R1 . . . Reception authority information
R2 . . . Execution authority information
7 . . . Switch
8 . . . Storage unit
10 . . . Storage control apparatus
110 . . . Communication port package
120 . . . Microprocessor package
121 . . . Microprocessor
122 . . . Package memory
130 . . . Memory package
131 . . . Shared memory
132 . . . Cache memory
140 . . . Backend package
151 . . . Storage unit
152 . . . Logical volume
T10 . . . I/O allocation table
T20, T30 . . . Volume configuration information
T21, T31 . . . Owner authority management table

BEST MODE FOR CARRYING OUT THE INVENTION

FIG. 1 is an explanatory diagram showing an overview of embodiments of the present invention. The configuration shown in FIG. 1 is not to limit the scope of the present invention, and configurations other than the configuration shown in FIG. 1 are included within the scope of the present invention. As will be described hereinafter, in the present embodiment, management information (volume configuration information) that is used for controlling the operation of a storage control apparatus is stored in a local memory of each microprocessor. Further, according to the present embodiment, in a predetermined case the volume configuration information is rearranged to a position in accordance with each case. In addition, according to the present embodiment, the processing for rearranging the volume configuration information is changed depending on the type of a host serving as a command issuer.

A storage control apparatus 1 according to the present embodiment is connected to a host computer (to be abbreviated to "host" hereinafter) 2. Examples of the host 2 include a server computer, mainframe computer, and the like.

FIG. 1(1) a substantial part of the storage control apparatus 1. The detailed configuration of the storage control apparatus 1 is described with reference to FIG. 2 hereinafter. The storage control apparatus 1 has, for example, a first communication part 3, a second communication part 4, a shared memory 5, a plurality of microprocessor packages 6(0), 6(1), a switch 7, and a storage unit 8. Note that the microprocessor packages 6(0), 6(1) are called "microprocessor packages 6" in the following description, unless otherwise designated.

The first communication part 3 is a control circuit in charge of communication with the host 2. The first communication part 3 is connected to the second communication part 4, the shared memory 5, and each microprocessor package 6, via the switch 7. The first communication part 3 has an I/O allocation table (see FIGS. 4 and 8) that is used for determining which one of the microprocessor packages 6 to transmit a command received from the host 2 to. I/O is an abbreviation of Input/Output.

Based on a logical address of the command and the I/O allocation table, the first communication part 3 determines the microprocessor package 6 for processing the command. The first communication part 3 transmits this command to the determined microprocessor package 6. The first communication part 3 further conveys a response of the microprocessor package 6 to the host 2.

The second communication part 4 is a control circuit in charge of communication with the storage unit 8. The second communication part 4 is connected to the first communication part 3, the shared memory 5, and each microprocessor package 6, via the switch 7. The diagram shows one storage unit 8, but a plurality of storage units 8 are actually provided. A logical storage area is generated using a physical storage area of the storage unit 8. The logical storage area is called "logical volume" (see FIG. 2). In the present embodiment, sometimes the logical volume is displayed as "LDEV (Logical Device)." Note that one storage unit 8 can be provided with one or a plurality of logical volumes, or a plurality of storage units 8 can be provided with one or a plurality of logical volumes.

Examples of the storage unit include a hard disk device, a semiconductor memory device, an optical disk device, a magneto-optical disk device, a magnetic tape drive, and various other storage units capable of reading/writing data. When using the hard disk device, for example, an FC (Fiber Channel) disk, an SCSI (Small Computer System Interface) disk, a SATA disk, an ATA (AT Attachment) disk, an SAS (Serial Attached SCSI) disk, or the like can be used.

Furthermore, for example, a flash memory, a FeRAM (Ferroelectric Random Access Memory), an MRAM (Magnetoresistive Random Access Memory), a phase-change memory (Ovonic Unified Memory), a RRAM (Resistance RAM), a PRAM (Phase Change RAM), or other storage unit can be used. In addition, for example, a configuration is possible in which different types of storage units, such as a flash memory device and a hard disk drive, can be combined within the same storage unit.

The shared memory 5 is connected to the first communication part 3, the second communication part 4 and each microprocessor package 6, via the switch 7. The shared memory 5 stores various information used by each of the circuits 3, 4, 6. The stored contents in the shared memory 5 are described in detail with reference to FIGS. 5 and 6.

Figure 5:
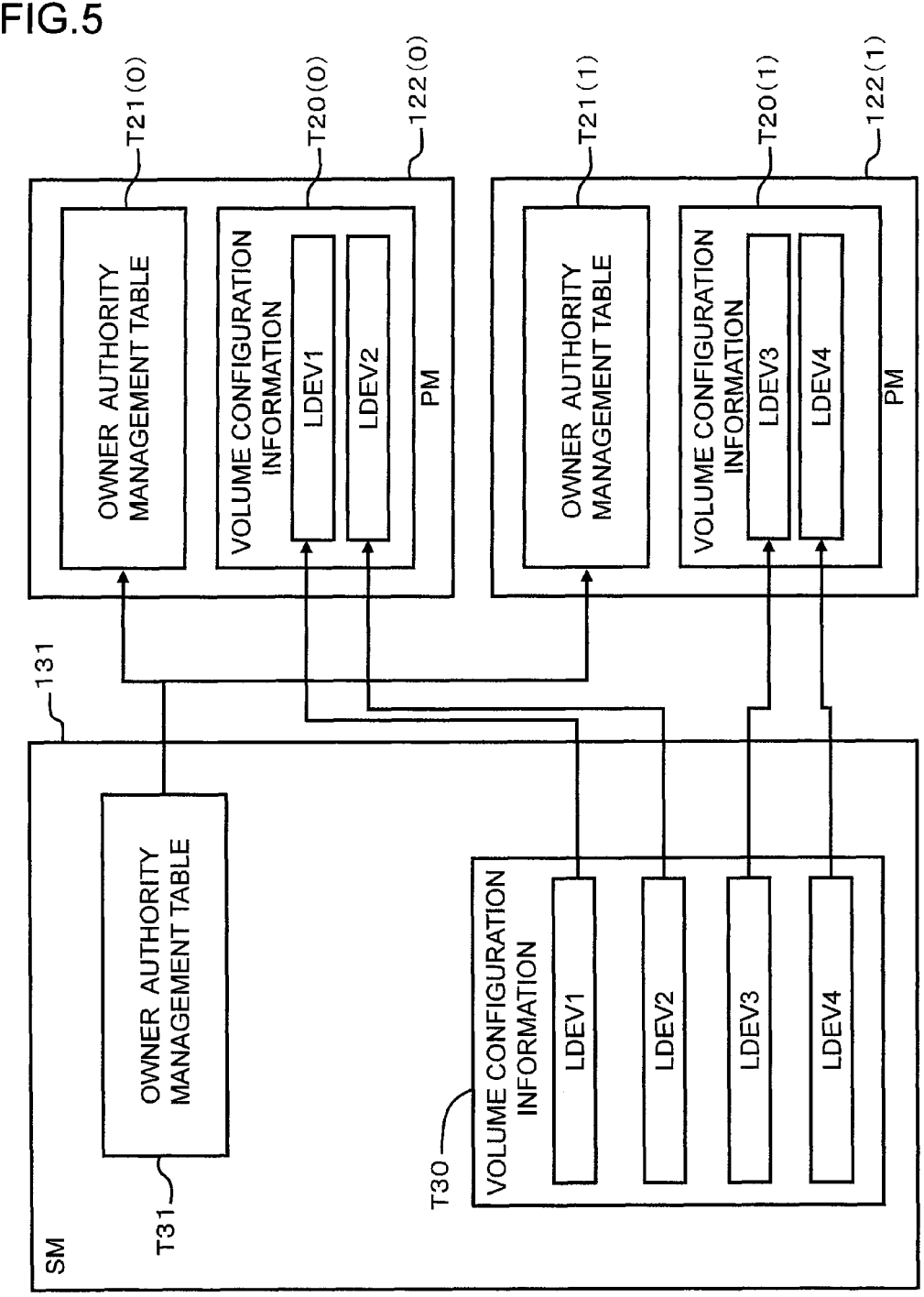
FIG. 5 A diagram showing the relationship between stored contents of a shared memory and stored contents of package memories within microprocessor packages.

The shared memory 5 stores at least the volume configuration information and an owner authority management table (see FIG. 5). The information and the table stored in the shared memory 5 are master information, and when this information and the table are updated, the information copied to the circuits 3, 4, 6 are also updated.

The microprocessor packages 6 control the operation of the storage control apparatus 1. Each of the microprocessor package 6 is connected to the first communication part 3, the second communication part 4, the shared memory 5, and the other microprocessor packages 6, via the switch 7. FIG. 1 shows the two microprocessor packages 6(0), 6(1), but three or more microprocessor packages can be provided. Each microprocessor package 6 has, for example, a plurality of microprocessors 6A and a package memory 6B.

The microprocessors 6A process the command issued by the host 2. The result of this processing is returned to the host 2 via the first communication part 3. The package memory 6B corresponding to "a local memory arranged for each microprocessor" or "a local memory within each microprocessor package" stores, for example, LDEV information T1 as "volume configuration information," as well as reception authority information R1 and execution authority information R2 as "use authority information."

The types (attributes) of the microprocessors 6A can be largely classified as a synchronous processing processor for processing the command issued by the host 2 and an asynchronous processing processor for performing processing different from the command processing. The types of the microprocessors 6A may include a type called a "combination-type processor" capable of performing the command processing and/or the different processing. A program described hereinafter is used to determine what kind of attributes the microprocessors 6A have.

The synchronous processing microprocessor 6A processes the command issued by the host 2, by referring to the LDEV information T1. In the case of a read command, for example, the microprocessor 6A reads designated data from a designated logical volume and transmits the data to the host 2. In the case of a write command, the microprocessor 6A writes write data into the designated logical volume.

The relationship among the reception authority information R1, the execution authority information R2, and the LDEV information T1 is described. The reception authority information R1 is information representing possession of authority to receive a command. The execution authority information R2 is information representing possession of authority to process the command. The LDEV information T1 is for managing the configuration of the logical volumes managed by the microprocessor packages 6. The LDEV information T1 is stored in the package memory 6B of the microprocessor packages 6 having the execution authority information R2. Normally, the reception authority information R1 and the execution authority information R2 are stored in the package memory 6B of the same microprocessor packages 6.

When the microprocessor package 6(0) manages one logical volume, the microprocessor package 6(0) has the reception authority information R1 and the execution authority information R2 for this logical volume. Therefore, the LDEV information T1 relating to this logical volume is stored in the package memory 6B within the microprocessor package 6(0). When the first communication part 3 receives a command for processing this logical volume, this command is transferred to the microprocessor package 6(0) having the reception authority information R1. The microprocessor package 6(0) having the execution authority information R2 processes the command using this logical volume, and returns the result of this processing to the host 2.

Similarly, when the microprocessor package 6(1) manages the other logical volume, the microprocessor package 6(1) has the reception authority information R1 and the execution authority information R2 for this logical volume. Therefore, the LDEV information T1 relating to this logical volume is stored in the package memory 6(B) within the microprocessor package 6(1). When the first communication part 3 receives a command for processing this logical volume, this command is transferred to the microprocessor package 6(1) having the reception authority information R1. The microprocessor package 6(1) having the execution authority information R2 processes the command using this logical volume, and returns the result of this processing to the host 2.

Because the LDEV information T1 relating to the logical volume of each of the microprocessor packages 6 is stored in the package memory 6B, it is not necessary to access the LDEV information (master) of the shared memory 5. For this reason, the command can be processed at high speeds.

When there is no change in the logical volume of each of the microprocessors 6, that is, when a management target logical volume is not changed, it is not necessary to move the LDEV information T1. In a predetermined case, however, the LDEV information T1 needs to be moved to a different microprocessor package.

For example, when forming a copy pair, it is preferred that a copy source logical volume (to be referred to as "copy source volume" hereinafter) and a copy destination logical volume (to be referred to as "copy destination volume" hereinafter) be handled by the same microprocessor package 6 so as to reduce the processing time. Therefore, when forming a copy pair, the LDEV information T1 of the copy source volume needs to be moved to the package memory 6B of the microprocessor package 6 handling the copy destination volume, or to the package memory 6B of the microprocessor package 6 handling the copy source volume. Here, moving the LDEV information T1 means copying the LDEV information T1 from a source to a destination and then deleting the LDEV information T1 of the source.

In another example, the microprocessor packages 6 stop due to the occurrence of a failure. When each of the microprocessors 6A within the microprocessor package 6 stops for some reason, the microprocessor package 6 is blocked. In this case, the logical volume handled by the blocked microprocessor package 6 needs to be handled by the normal microprocessor package 6 instead.

On the occurrence of a failure, the microprocessor package 6 that executes the processing on behalf of the microprocessor package 6 with the failure needs to acquire the LDEV information T1 of the logical volume managed by the microprocessor package 6 with the failure. Therefore, the LDEV information T1 within the shared memory 5 is copied to the package memory 6B of the normal microprocessor package 6 that performs the processing on behalf of the microprocessor package 6 with the failure. Note that the normal microprocessor package 6 carrying out the processing on behalf of the microprocessor package 6 with the failure is sometimes called "substitution microprocessor package 6."

In yet another example, load is distributed between the microprocessor packages 6. For example, suppose that the microprocessor package 6(0) handles a first logical volume and a second logical volume and the microprocessor package 6(1) handles a third logical volume and a fourth logical volume. Also, suppose that the access frequency and access size to the first logical volume and the second logical volume are large, whereas the access frequency and the access size to the third logical volume and the fourth logical volume are small.

In this case, the first logical volume is replaced with either the third logical volume or the fourth logical volume, or the second logical volume is replaced with either the third logical volume or the fourth logical volume. As a result, the difference between the load on the microprocessor package 6(0) and the load on the microprocessor package 6(1) can be reduced. In this manner, the logical volume managed by each of the microprocessor packages 6 needs to be moved between the microprocessor packages 6 for the purpose of load distribution.

For the reasons described above, when moving the LDEV information T1, first the reception authority information R1 is moved to the destination microprocessor package 6, and then the execution authority information R2 is moved to the destination microprocessor package 6.

Specifically, for example, the reception authority information R1 is associated with the destination microprocessor package 6 on the I/O allocation table within the first communication part 3. As shown in FIG. 1(2), the command issued by the host 2 thereafter is transferred to the destination microprocessor package 6 by the first communication part 3.

However, since the destination microprocessor package 6 does not yet have the execution authority information R2 at this moment nor has acquired the LDEV information T1, the command received from the first communication part 3 cannot be processed. The destination microprocessor package 6, therefore, accumulates the received commands in a queue and stands by until the execution authority information R2 can be acquired.

The source microprocessor package 6 determines whether there are no longer commands in process that relate to the movement target logical volume. When there are no longer commands in process, the execution authority information R2 relating to the movement target logical volume is moved from the source microprocessor package 6 to the destination microprocessor package 6.

Once acquiring the execution authority information R2, the destination microprocessor package 6 reads the LDEV information T1 from the shared memory 5 and stores the LDEV information T1 in the package memory 6B within the destination microprocessor package 6. In this manner, the destination microprocessor package 6 can process the command relating to the movement target logical volume.

Although described in detail later, a method for treating an unprocessed command remaining in the source microprocessor package 6 can be changed, depending on the type of the host 2. In the case of a so-called open system host 2, the unprocessed command remaining in the queue of the source microprocessor package 6 is transferred to the destination microprocessor package 6 after the reception authority information R1 is moved to the destination microprocessor package 6. The commands in process are processed by the source microprocessor package 6, and only the unprocessed command is transferred to the destination microprocessor package 6.

When the host 2 is a mainframe, on the other hand, the size of the commands issued by the host 2 is large. Therefore, even when the source microprocessor package 6 loses the reception authority information R1, the source microprocessor package 6 processes the commands remaining in the queue (CCW (Channel Command Word) Chain) as long as the source microprocessor package 6 has the execution authority information R2.

The execution authority information R2 cannot be moved to the destination microprocessor package 6 unless all of the commands in process within the source microprocessor package 6 are lost. When the source microprocessor package 6 processes a long command chain unique to the mainframe for a long period of time, the time required for finishing moving the logical volumes increases.

Therefore, a predetermined time period for forcibly moving the execution authority information R2 is set in advance. When the predetermined time period elapses, the source microprocessor package 6 requests the host 2 to reissue a command. Specifically, the source microprocessor package 6 requests the mainframe host 2 for a retry. In response to this, the host 2 reissues a command. The reissued command is transferred to the destination microprocessor package 6 by the first communication part 3.

According to the present invention configured as described above, in a predetermined case the volume configuration information stored in the package memory 6B of each microprocessor package 6 can be rearranged to an appropriate place, improving the usability and reliability.

According to the present embodiment, the volume configuration information can be rearranged without stopping the host 2 from having access, whereby the usability is improved.

Moreover, according to the present embodiment, a method suitable for both the open system host and the mainframe can rearrange the volume configuration information, and therefore is effective particularly in an information processing system where both the open system host 2 and the mainframe exist. The present embodiment is described hereinafter in more detail.

Embodiment 1

Figure 2:
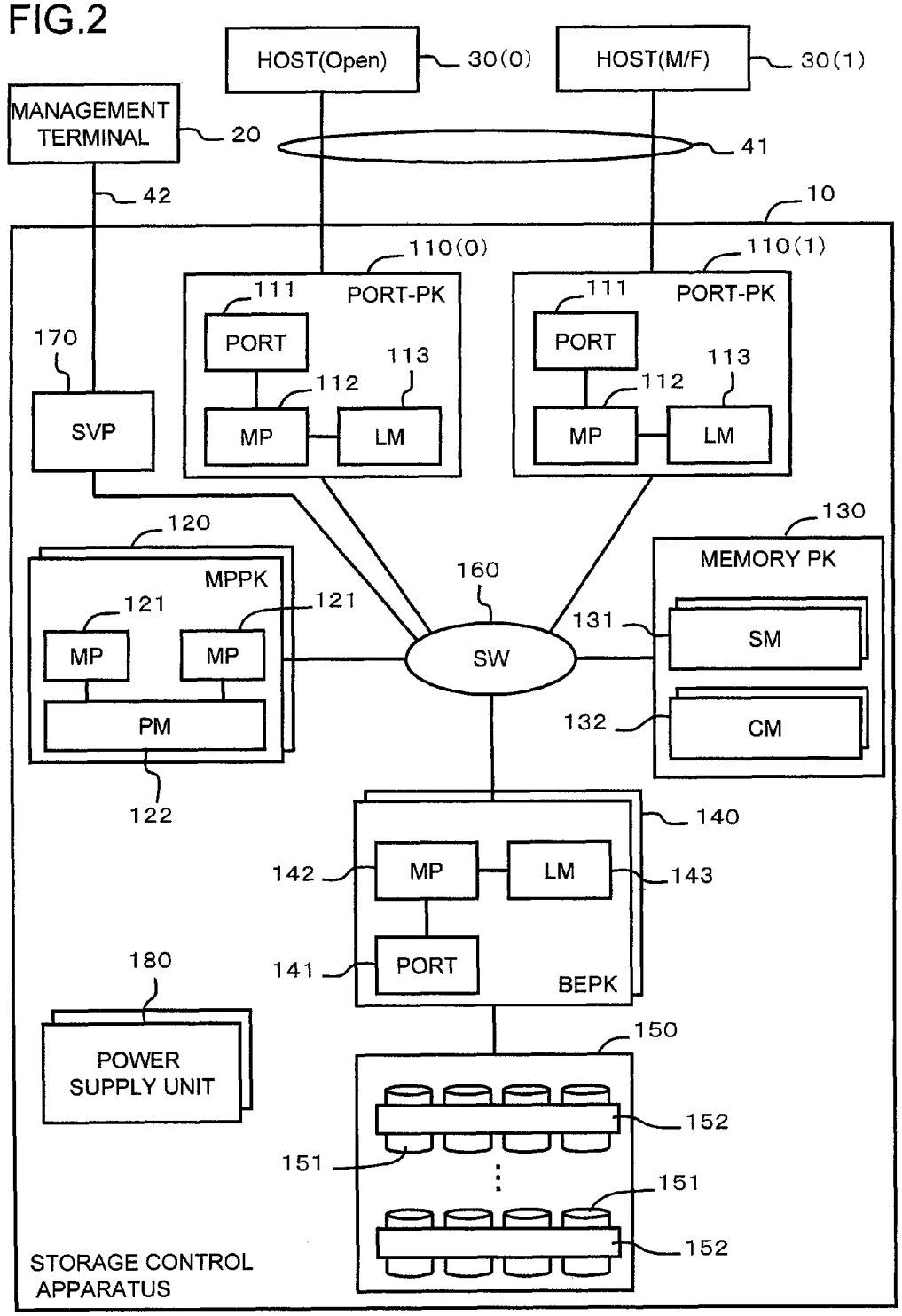
FIG. 2 A block diagram of a storage control apparatus.

FIG. 2 shows the entire information processing system having a storage control apparatus 10. First, a correspondence relationship between FIG. 2 and FIG. 1 is explained. The storage control apparatus 10 corresponds to the storage control apparatus 1, hosts 30 (30(0), 30(1)) to the host 2, communication port packages (PORT-PK) 110 (110(0), 110(1)) to the first communication part 3, microprocessor packages 120 (MPPK) to the microprocessor packages 6, shared memories 131 to the shared memory 5, backend packages (BEPK) 140 to the second communication part 4, storage units 151 to the storage unit 8, and a switch 160 to the switch 7. In the present embodiment, the reception authority R1 is called "precedent owner authority," and the execution authority R2 is called "execution owner authority."

The storage control apparatus 10 has, for example, the communication port packages 110, microprocessor packages 120, memory package 130 (memory PK 130 in the diagram), backend packages 140, a storage control mounting part 150, the switch 160, a service processor 170 (SVP 170 in the diagram), and power supply units 180.

Each communication port package 110 is a control board in charge of communication with the host 30. The communication port package 110 has a plurality of communication ports 111, a microprocessor 112, and a local memory 113. The microprocessor 112 controls the operation of the communication port package 110. An I/O allocation table T10, which is described hereinafter, is stored in the local memory 113. Each communication port 111 is connected to a predetermined host 30 via a communication network 41.

The communication port package 110(0) shown on the left-hand side of FIG. 2 corresponds to the so-called open system host. The communication port package 110(1) shown on the right-hand side of FIG. 2 corresponds to the mainframe (M/F). Note that one of the communication port packages 110 may correspond to both the open system host and the mainframe. As the communication network 41, an FC_SAN (Fiber Channel_Storage Area Network) or an IP_SAN (Internet Protocol_SAN), for example, can be used.

In the case of the FC_SAN, the host 30 and the communication port package 110 perform data communication according to a fiber channel protocol. When the host 30 is the mainframe, the data communication is carried according to a communication protocol, such as FICON (Fiber Connection™), ESCON (Enterprise System Connection™), ACON-ARC (Advanced Connection Architecture™), or FIBARC (Fiber Connection Architecture™). In the case of IP_SAN, the host 30 and the communication port package 110 perform the data communication according to a protocol, such as a TCP/IP (Transmission Control Protocol/Internet Protocol).

Each backend package 140 is a control board in charge of communication with the storage units 151. The backend package 140 has a plurality of communication ports 141, a microprocessor 142, and a local memory 143. The microprocessor 142 controls the operation of the backend package 140. Management data and the like used by the microprocessor 142 is stored in the local memory 143. Each communication port 141 is connected to each storage unit 151.

The memory package 130 has a shared memory region 131 and a cache memory region 132. For example, various management information, which is described hereinafter, is stored in the shared memory region 131. User data and the like, for example, is stored in the cache memory region 132. Hereinafter, the shared memory region 131 is called "shared memory 131," and the cache memory region 132 is called "cache memory 132." For convenience of explanation, the present embodiment illustrates a case where a cache management table T32 (see FIG. 6) is stored in the shared memory 131. Instead, the cache management table T32 may be stored in the cache memory 132.

Each microprocessor package 120 is a control board for controlling the operation of the storage control apparatus 10. The microprocessor package 120 has microprocessors 121 and a package memory 122.

The microprocessor package 120 executes commands issued by the host 30, and transmits the result of the execution to the host 30. When the communication port package 110 receives a read command, the microprocessor package 120 acquires required data from the cache memory 132 or the storage units 151 and transmits the data to the host 30.

When the communication port package 110 receives a write command, the microprocessor package 120 writes the write data into the cache memory 132 and notifies the host 30 of the completion of this processing. The data written to the cache memory 132 is thereafter written to the storage units 151. The configuration of the microprocessor package 120 is described in more detail with reference to FIG. 3.

Each storage unit 151 is configured by, for example, a hard disk drive, a flash memory device, or other storage unit. The plurality of storage units 151 can be brought into one group 150. This group 150 is called, for example, "RAID group" or "parity group." One or a plurality of logical volumes 152 are formed in the grouped storage regions.

The switch 160 is a circuit for connecting the packages 110, 120, 130 and 140. The communication port packages 110, backend packages 140, and microprocessor packages 120 can access the memory package 130 via the switch 160.

The service processor 170 is a control circuit for collecting various information stored in the storage control apparatus 10 and providing a management terminal 20 with this information or storing a set value or the like input from the management terminal 20 into the shared memory 131. The service processor 170 is connected to the management terminal 20 via another communication network 42, such as Local Area Network (LAN).

Each power supply unit 180 is a unit for supplying a predetermined power to the circuits 110 to 170 consuming power. The power supply unit 180 can have, for example, a circuit for converting an AC source input from the outside of the storage control apparatus 10, into a DC source, a circuit for converting the DC source into a plurality of DC sources, and a battery unit.

Figure 3:
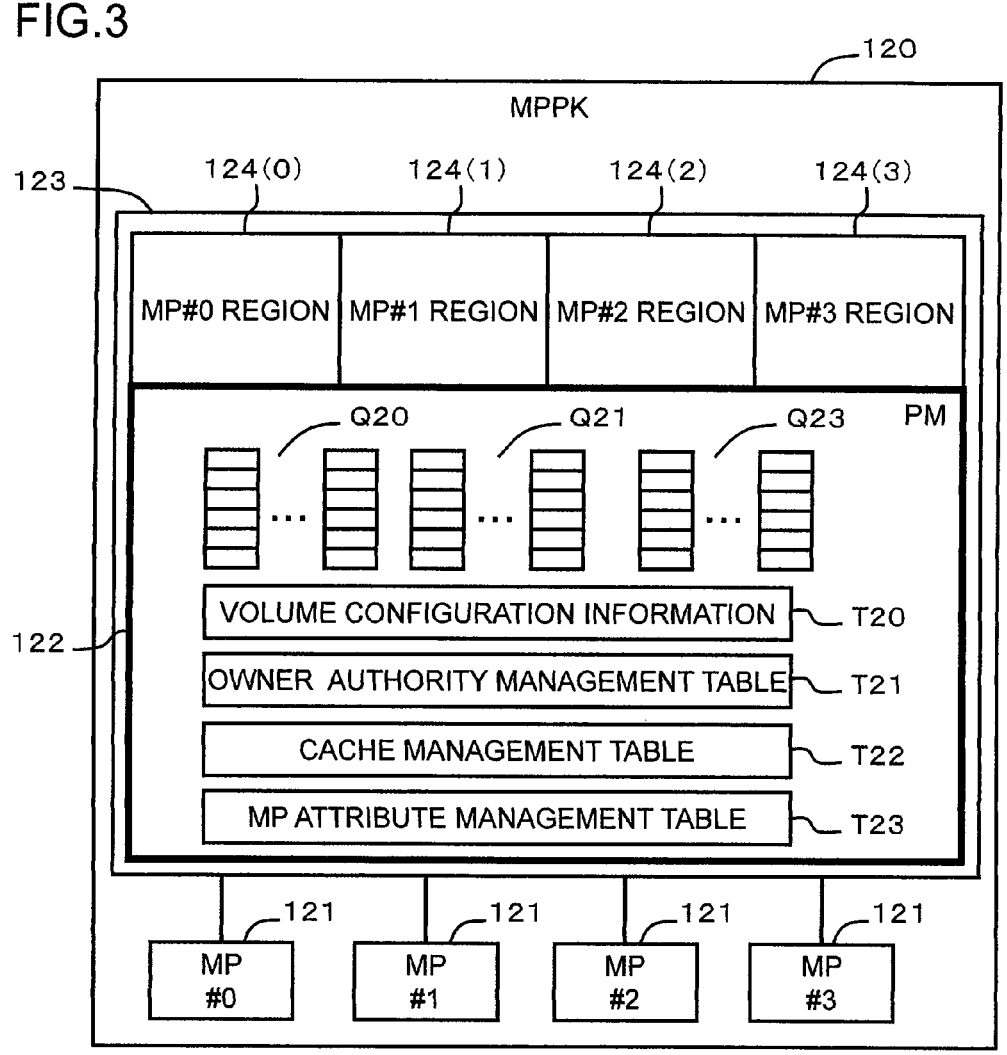
FIG. 3 A diagram schematically showing a configuration of a microprocessor package.

FIG. 3 is a diagram schematically showing the configuration of each microprocessor package 120. The microprocessor package 120 has, for example, four microprocessors 121 and one local memory 123.

The local memory 123 is separated into a plurality of dedicated areas 124(0) to 124(3) and one shared use area 122. The dedicated areas 124(0) to 124(3) are allocated to corresponding microprocessors 121(#0) to 121(#3), respectively. For example, only the microprocessor 121(#0) can use the dedicated area 124(0). Only the microprocessor 121(#1) can use the dedicated area 124(1). Similarly, only the microprocessor 121(#2) can use the dedicated area 124(2), and only the microprocessor 121(#3) can use the dedicated area 124(3).

The shared use area 122 can use any of the microprocessors 121(#0) to 121(#3). The area 122 that is shared by the microprocessors 121(#0) to 121(#3) of the same microprocessor package 120 is called "package memory 122" in the present embodiment.

For example, an open system host command queue Q20, a mainframe command queue Q21, a job queue Q23, volume configuration information T20, an owner authority management table T21, a cache management table T22, an a microprocessor attribute management table T23 are stored in the package memory 122.

The open system host command queue Q20 accumulates therein commands issued by the open system host. The mainframe command queue Q21 accumulates therein commands from the mainframe. The job queue Q23 manages each job that uses the logical volumes.

The volume configuration information T20 functioning as "second volume configuration information" is information indicating the configuration of the logical volumes 152 managed by the microprocessor package 120. The detail of the information is described hereinafter. The owner authority management table T21 functioning as "second use authority information" manages the microprocessor package 120 having authority to use each logical volume 152 within the storage control apparatus 10. The cache management table T22 manages data stored in the cache memory 132. The microprocessor attribute management table T23 manages the attribute of each microprocessor 121. The detail thereof is described hereinafter.

Figure 4:
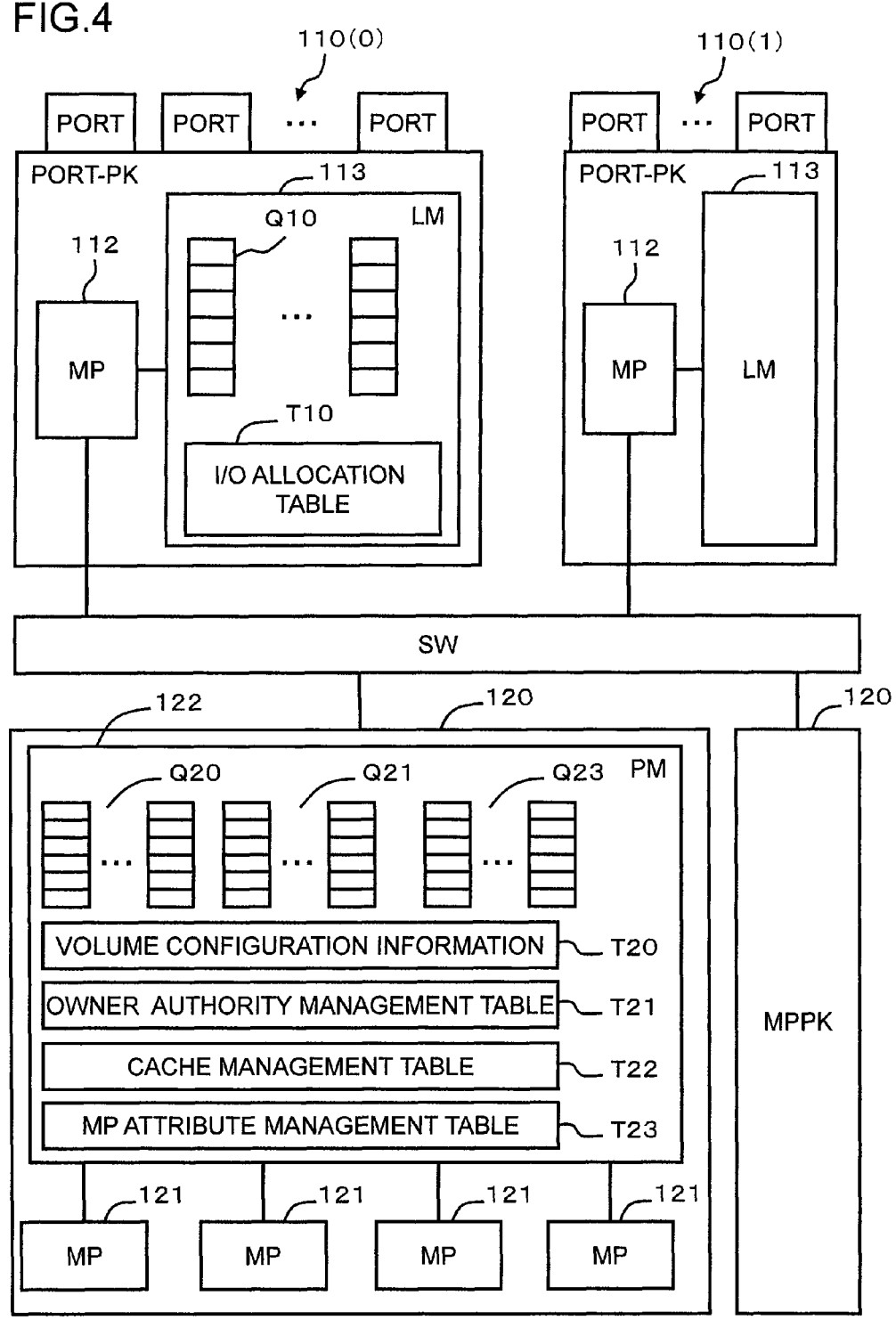
FIG. 4 A diagram showing configurations of a communication port package and a microprocessor package.

FIG. 4 shows the relationship of the communication port packages 110 to the microprocessor packages 120. An output management queue Q10 and the I/O allocation table T10 are stored in the local memory 113 of each communication port package 110. The output management queue Q10 is a queue for managing a response received from each microprocessor package 120. The response means information representing the result of processing the commands issued by the host 30.

FIG. 5 shows the relationship between the shared memory 131 and each package memory 122 (122(0), 122(1)). An owner authority management table T31 functioning as "first use authority information" is stored in the shared memory 131. The owner authority management table T21 (T21(0), T21(1)), functioning as the "second use authority information," which is a copy of the owner authority management table T31, is stored in each package memory 122.

Volume configuration information T30 functioning as "first volume configuration information" is stored in the shared memory 131. The volume configuration information T20 (T20(0), T20(1)) functioning as the "second volume configuration information" is stored in each package memory 122. The volume configuration information T20 within the package memory 122 is a part of the volume configuration information T30 of the shared memory 131.

Specifically, out of the volume configuration information T30, the information relating to the logical volumes 152 managed by the microprocessor package 120 is copied as the volume configuration information T20 within the package memory 122. In the example shown in FIG. 5, the volume configuration information T20 relating to two logical volumes (LDEV1, LDEV2) is stored in the package memory 122(0), and the volume configuration information T20 relating to another two logical volumes (LDEV3, LDEV4) is stored in the package memory 122(1).

The execution owner authority represents authority to process the commands using the logical volumes 152. Therefore, the microprocessor package 120 having the execution owner authority of the logical volumes 152 has the volume configuration information T20 relating to the logical volumes 152. When the microprocessor package 120 in charge of the logical volumes 152 is changed, the place for storing the execution owner authority and the volume configuration information T20 is also changed. Note that the precedent owner authority is moved prior to moving the execution owner authority. After the completion of movement of the logical volumes 152, the execution owner authority, the precedent owner authority and the volume configuration information T20 are stored in the same package memory 122.

Figure 6:
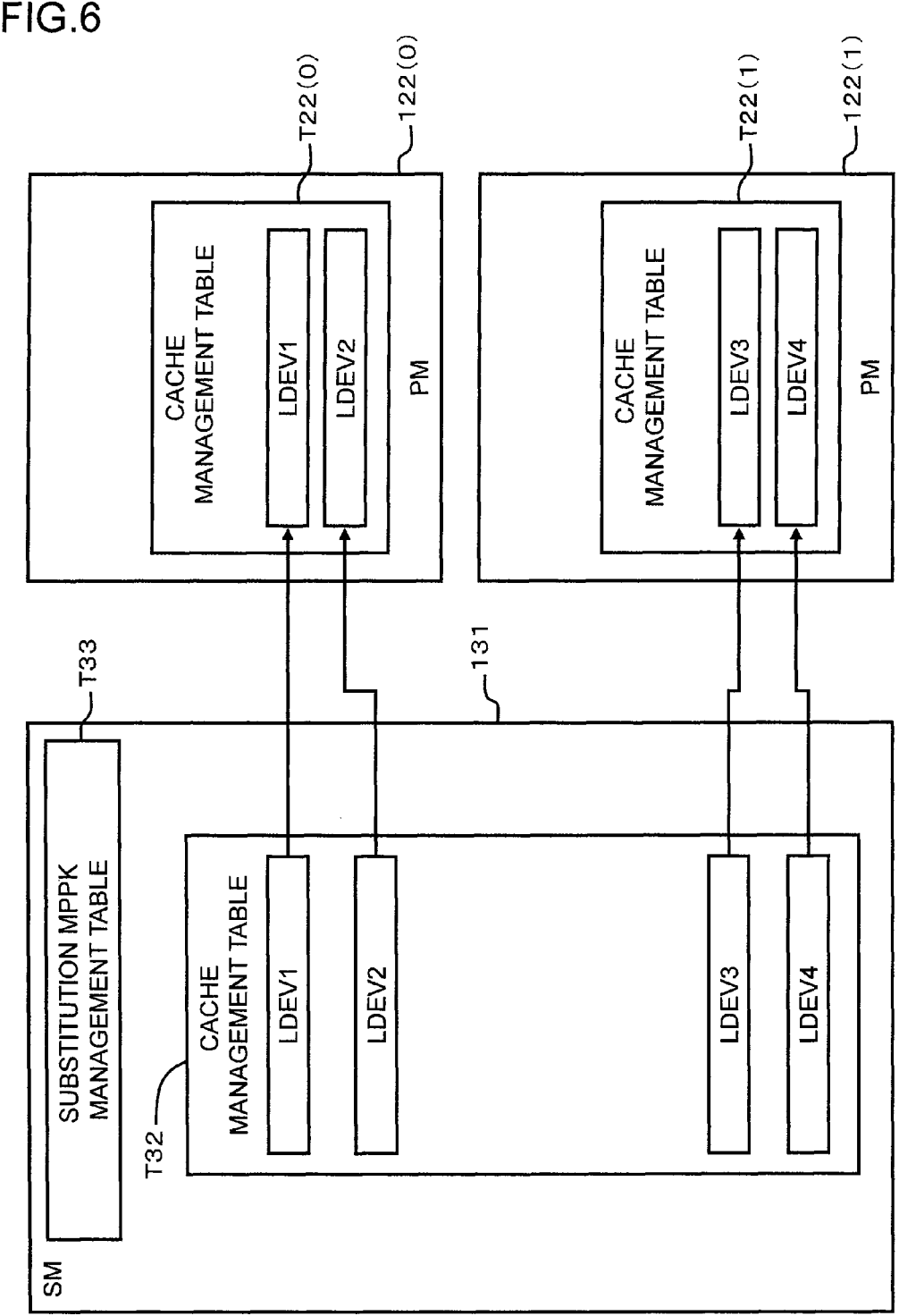
FIG. 6 A diagram showing the relationship between other stored contents of the shared memory and other stored contents of package memories of the microprocessor packages.

FIG. 6 shows another relationship between the shared memory 131 and each package memory 122. A management table T33 for determining a substitution microprocessor package 120 on the occurrence of a failure is stored in the shared memory 131. The method of creating and using the table T33 is described hereinafter.

The shared memory 131 also stores the cache management table T32. The cache management table T22 (T22(0), T22(1)), which is a part of the cache management table T32, is stored in each package memory 122. As with the volume configuration information T20, only the cache information relating to the logical volumes 152 managed by the microprocessor packages 120 is stored in each package memory 122.

As described with reference to FIGS. 5 and 6, the volume configuration information T30, the owner authority management table T31, the substitution microprocessor package management table T33, and the cache management table T32 are stored in the shared memory 131.

FIG. 7 shows a configuration of the volume configuration information T30 (T20). The volume configuration information T30 within the shared memory 131 and the volume configuration information T20 within each package memory 122 are basically the same. Here, reference numeral T30 (T20) is applied to the table shown in FIG. 7, and the configuration thereof is described. The volume configuration information T30 (T20) associates, for example, an LDEV number C300, a RAID group number C301, a RAID configuration C302, a size C303, and a type C304 to one another and manages this information.

The LDEV number C300 is discrimination information for discriminating the logical volumes 152 within the storage control apparatus 10. The RAID group number C301 is discrimination information for specifying a RAID group provided with the logical volumes 152. The RAID configuration C302 is information representing the configuration of the RAID group. Examples of the information representing the configuration of the RAID group include a RAID level (for example, RAID 1, RAID 5, RAID 6, etc.) and a drive configuration (for example, 3D+1P, 6D+2P, etc.). "D" in the drive configuration represents a drive for storing data, and "P" represents a drive for storing parities.

The size C303 is information representing the storage capacity of each logical volume 152. The type C304 is information representing the type of the storage unit 151 configuring the logical volumes 152. "SATA" and "SAS" shown in FIG. 7 each represent the type of the hard disk drive, and "FM" represents a flash memory device. Note that items other than the items C300 to C304 shown in FIG. 7 may be managed as well.

Figure 8:
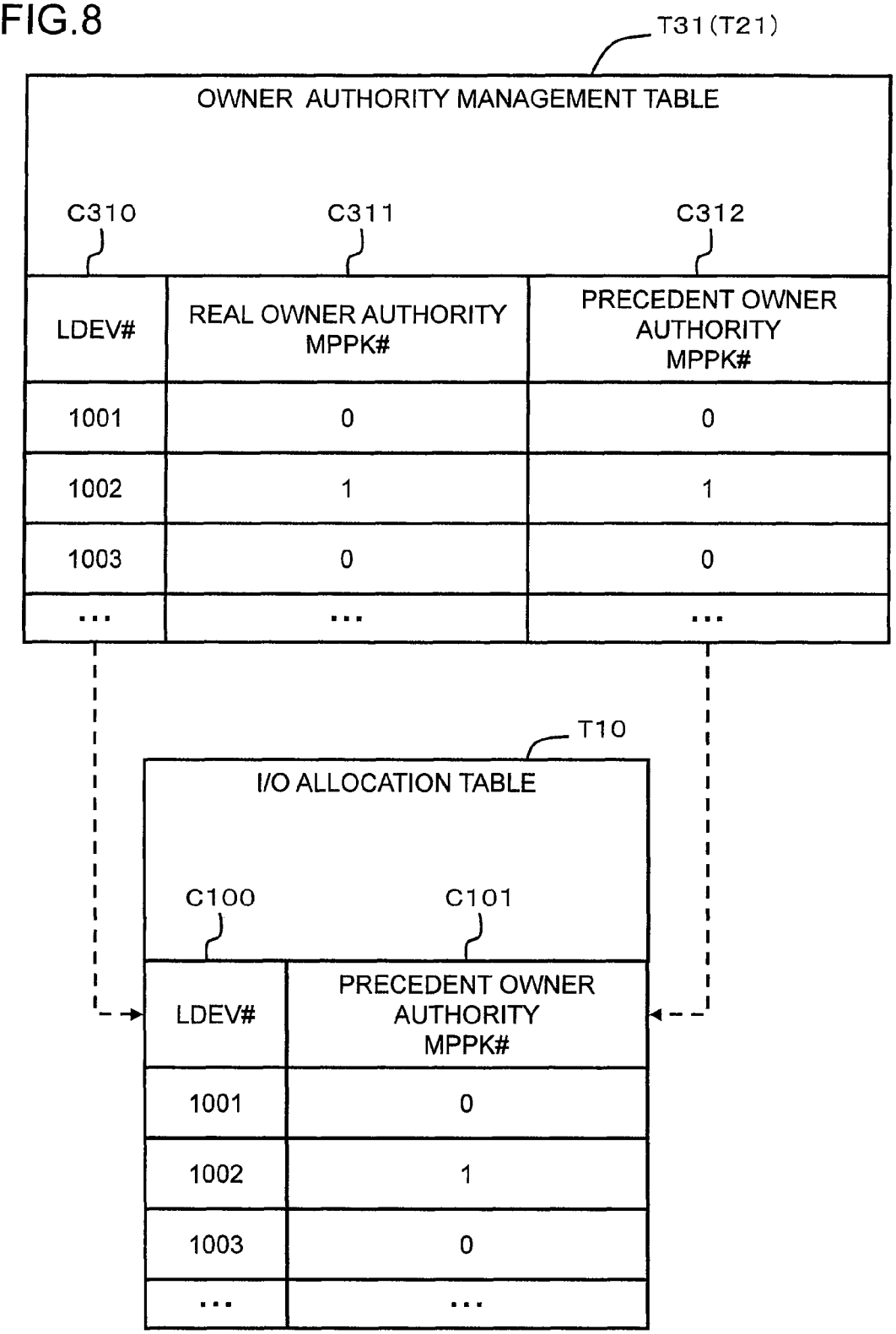
FIG. 8 A diagram showing a table for managing authority to use the logical volumes and a table for allocating commands.

FIG. 8 shows configurations of the owner authority management table T31 (T21) and the I/O allocation table T10. As described above, the owner authority management table T31 within the shared memory 131 and the owner authority management table T21 within each package memory 122 have basically the same structure, although the stored contents thereof differ from each other. Here, reference numeral T31 (T21) is applied to the table shown in FIG. 8, and the configuration thereof is described.

The owner authority management table T31 (T21) associates, for example, an LDEV number C310, a number C311 of the microprocessor package 120 having the real owner authority, and a number C312 of the microprocessor package 120 having the precedent owner authority, to one another, and manages this information.

The real owner authority represents authority to process a command using the logical volume 152 specified by the LDEV number C310. The precedent owner authority represents authority to receive a command for processing the logical volume 152 specified by the LDEV number C310.

Normally, the microprocessor package 120 having the real owner authority of a certain logical volume 152 and the microprocessor package 120 having the precedent owner authority of this logical volume 152 are the same. In a certain case, however, the precedent owner authority and the real owner authority that relate to the same logical volume 152 temporarily exist within separate microprocessor packages 120.

In the example shown in FIG. 8, the microprocessor package 120(#0) has the real owner authority and the precedent owner authority for two logical volumes 152 (LDEV#1001, LDEV#1003). The microprocessor package 120(#1) has the real owner authority and the precedent owner authority of another logical volume 152 (LDEV#1002).

The I/O allocation table T10 is shown on the lower side of FIG. 8. As described above, the I/O allocation table T10 is stored in the local memory 113 of the communication port package 110 and used for determining the allocation destination (transfer destination) of a command received from the host 30.

The I/O allocation table T10 associates, for example, an LDEV number C100 and a number C101 of the microprocessor package 120 having the precedent owner authority, to each other, and manages these information items. The microprocessor 112 of the communication port package 110 extracts the number (LDEV number) of the logical volume 152 from the command received by the communication port 111, and searches over the I/O allocation table T10 using this LDEV number. Accordingly, the microprocessor 112 specifies the microprocessor package 120 to which this command needs to be transferred, and transfers the command to this specified microprocessor package 120.

Figure 9:
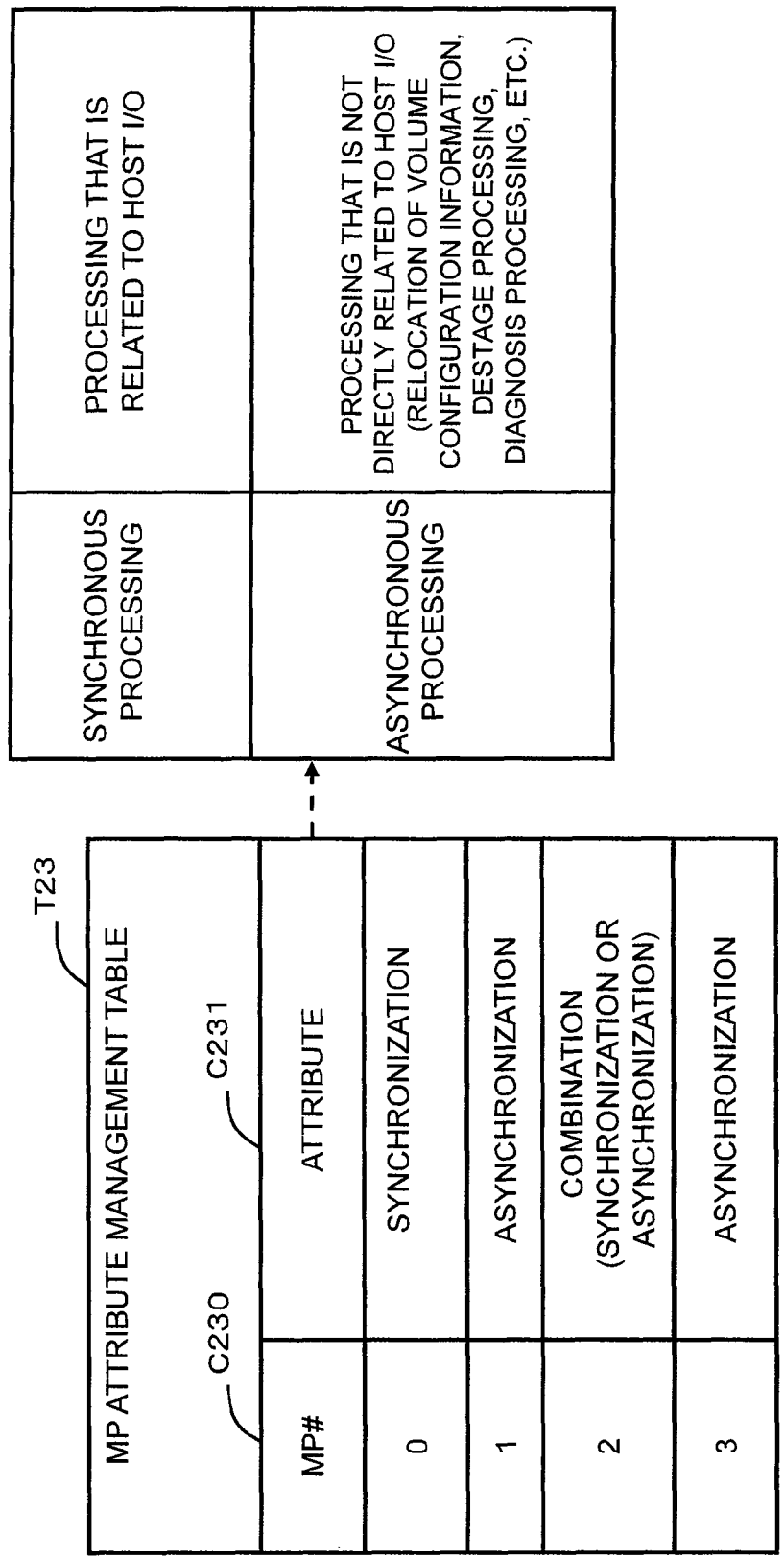
FIG. 9 A diagram showing a table for managing attributes of microprocessors.

FIG. 9 shows the table T23 for managing the attributes of the microprocessor 121. The management table T23 is prepared in each microprocessor package 120. The management table T23 associates, for example, a microprocessor number C230 and an attribute C231 to each other, and manages these information items.

The microprocessor number C230 is information for discriminating the microprocessors 121 within the same microprocessor package 120. The attribute C231 is information representing how each microprocessor 121 is used. Examples of the type of the attribute C231 include three items of "synchronous processing," "asynchronous processing," and "combination."

The attribute, "synchronous processing," is an attribute representing the microprocessor 121 for processing the command issued by the host 30, and can be also called "first attribute." The microprocessor 121 having the synchronous processing attribute corresponds to "first microprocessor."

The attribute, "asynchronous processing," is an attribute representing the microprocessor 121 for performing a different processing that does not directly relate to the command processing. The asynchronous processing attribute can also be called "second attribute." The microprocessor 121 having the asynchronous processing attribute corresponds to "second microprocessor."

The different processing that does not directly relate to the command processing can be, for example, processing for rearranging/relocating the volume configuration information that is a characteristic of the present embodiment, destage processing, and processing for diagnosing the presence/absence of a failure.

The attribute, "combination," is an attribute representing the microprocessor 121 capable of performing both the command processing and the different processing. The combination attribute can also be called "third attribute." The microprocessor 121 having the combination attribute corresponds to "third microprocessor."

At least one or more of the microprocessors 121 having the synchronous processing attribute exist within each microprocessor package 120. This is in order to process the commands from the host 30 at any time. In the present embodiment, control is performed such that the number of microprocessors 121 gradually increases as the number of accesses to the logical volumes 152 managed by the microprocessor package 120 increases. The response performance can be prevented from degrading, by increasing the number of microprocessors 121 capable of performing the command processing.

The combination attribute is set by any one or a plurality of the microprocessors 121 so that the different processing other than the command processing can be performed even when the microprocessor 120 enters a high-load state. How the microprocessor attributes are changed is described hereinafter with reference to FIGS. 14 and 15.

Figure 10:
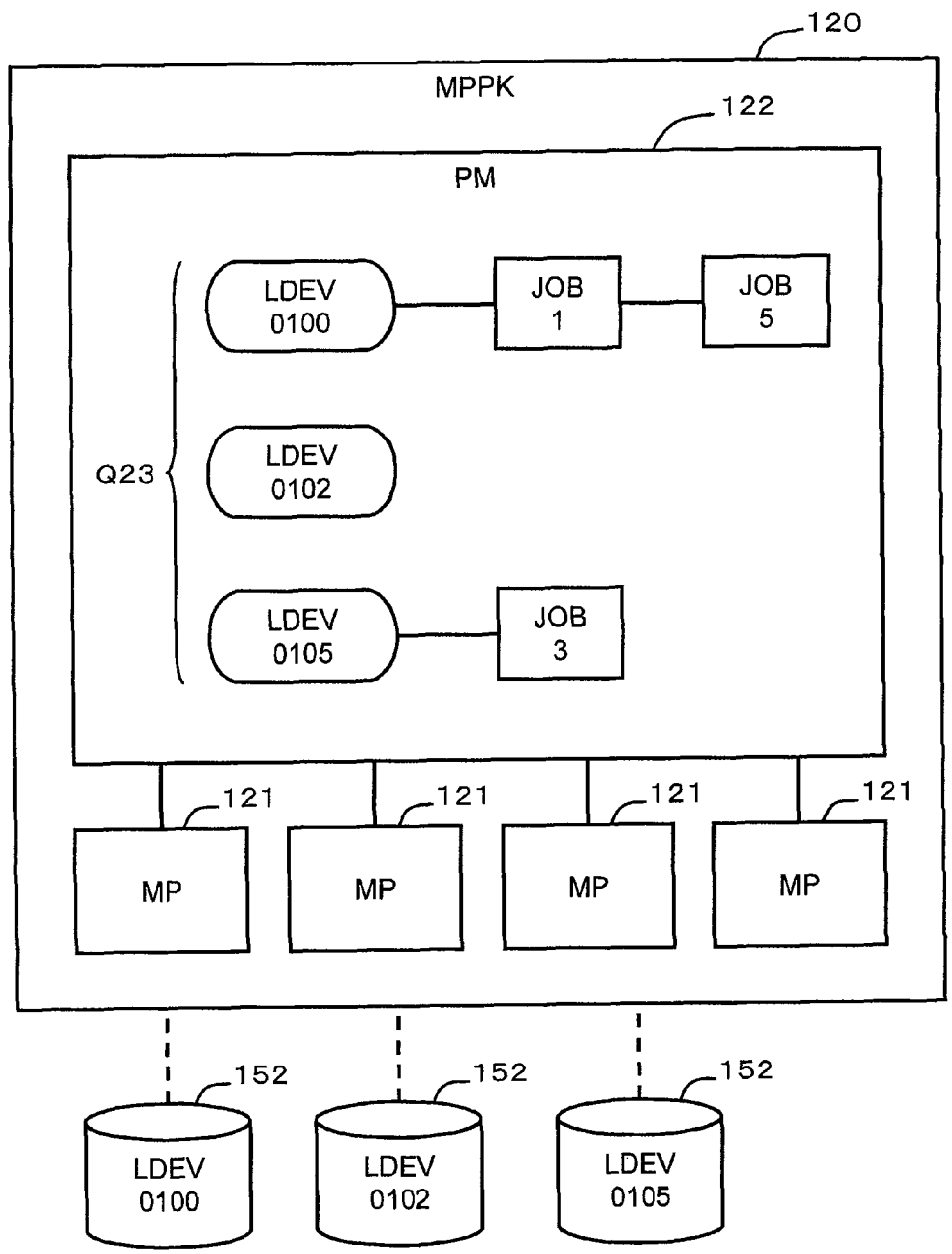
FIG. 10 A diagram schematically showing job management.

FIG. 10 schematically shows the job processing management. The command processing that is carried out in each processing unit is called a "job." The job that needs to use the volume configuration information T20 declares the use of the volume configuration information T20 to secure the volume configuration information T20 before accessing the volume configuration information T20, and releases the volume configuration information T20 after the completion of the processing thereof.

The package memory 122 of the microprocessor package 120 is provided with the job queue Q23 for each logical volume 152 with which this microprocessor package 120 has the real owner authority. Specifically, the dedicated job queue Q23 is prepared for each logical volume 152 managed by the microprocessor package 120.

The job for processing the command such as the read command or the write command enqueues a job number used for discriminating a job from other jobs, into the job queue Q23 corresponding to the logical volume 152 used for the command processing. In this manner, this job secures the logical volume 152 used for the command processing.

The job uses the volume configuration information T20 and the logical volume 152 to process the command. After the completion of the processing of the command, the job number of a job is dequeued from the job queue Q23.

In the example shown in FIG. 10, two jobs (#1, #5) are connected to a certain logical volume 152 (#0100), and one job (#3) is connected to another logical volume 152 (#0105). Specifically, these logical volumes 152 (#0100, #0105) are used for processing the command. Yet another logical volume 152 (#0102) is not secured by any jobs. In other words, this logical volume 152 (#0102) is not used at this point.

The precedent owner authority of each logical volume 152 can be moved first, regardless of whether or not it is secured by a job. The real owner authority is moved in a state in which there is no job using the logical volume 152. Note that, as described hereinafter, when processing a command issued by the mainframe, the real owner authority is moved after a lapse of predetermined time even during the processing of the command. Hereinafter, the case in which a command issued by the open system host is processed is mainly described.

Figure 11:
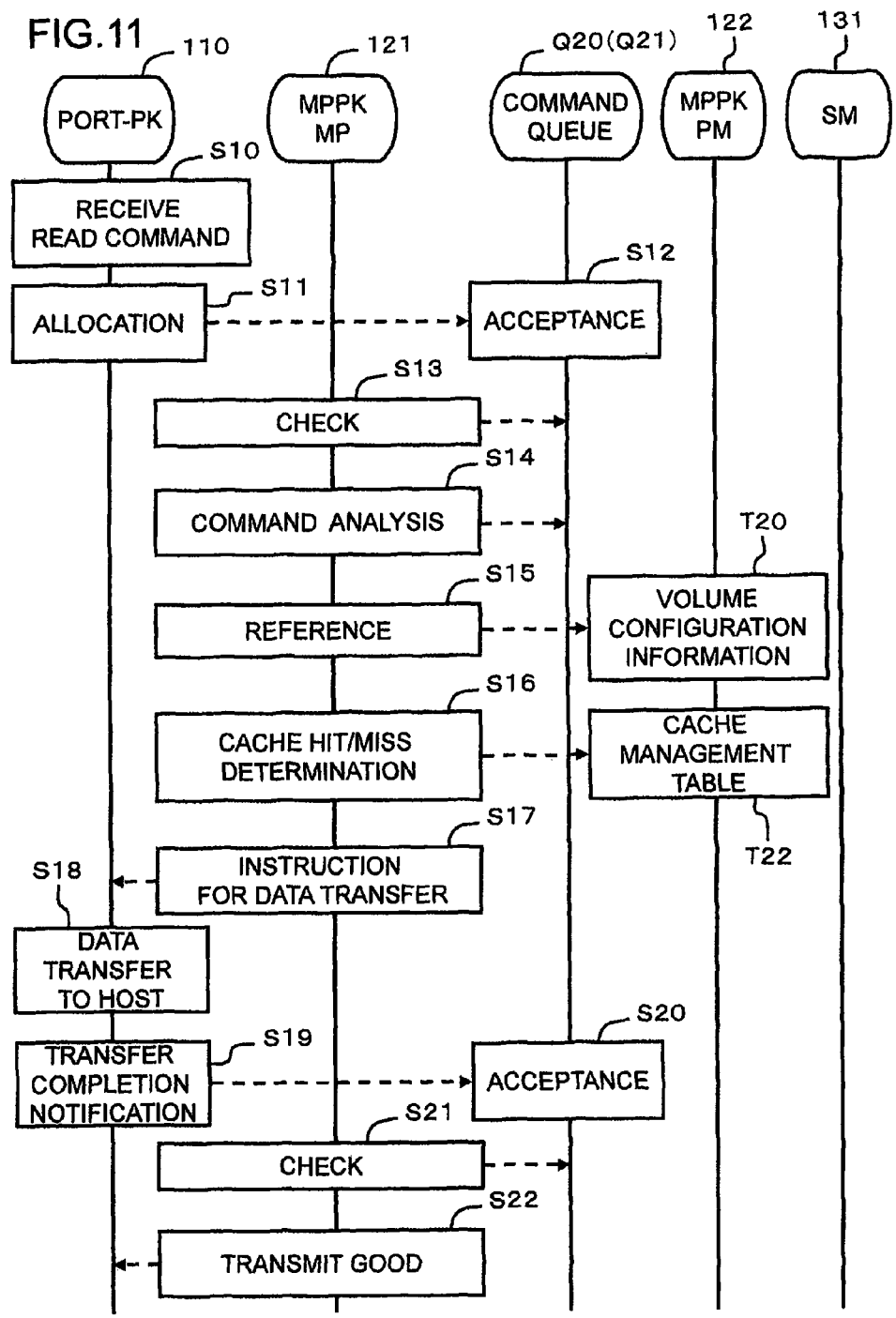
FIG. 11 A flowchart for processing a read command.

FIG. 11 is a flowchart showing how read processing is performed. A read command issued by the host 30 is received by the communication port package 110 (S10). The microprocessor 112 of the communication port package 110 refers to the I/O allocation table T10 and determines the transfer destination to which to transfer the read command. The microprocessor 112 transfers the read command to the determined microprocessor package 120 (S11). In the present embodiment, transferring a command to a predetermined transfer destination is sometimes described as "allocating a command."

The read command sent from the communication port package 110 reaches a predetermined microprocessor package 120 via the switch 160. This read command is enqueued into the command queue Q20 (S12).

Out of the four microprocessors 121 within the microprocessor package 120 that receives the read command, the microprocessor 121 in charge of the command processing (the microprocessor having the synchronous processing attribute or the microprocessor having the combination attribute) periodically checks the command queue Q20 (S13). Once the microprocessor 121 discovers that there is an unprocessed read command in the command queue Q20, the microprocessor 121 analyzes this read command (S14).

In the case of a read command from the open system host, the read command is transferred to the dedicated area 124 of the microprocessor 121 and then analyzed. On the other hand, in the case of a read command from the mainframe, this read command is analyzed while remaining in the package memory 122. In the case of the mainframe, a plurality of commands are connected in a chain shape and the command size is relatively large.

The microprocessor 121 refers to the volume configuration information T20 within the package memory 122 (S15). Next, the microprocessor 121 refers to the cache management table T22 within the package memory 122 to determine whether a cache hit or a cache miss is generated (S16).

A cache hit means that the data required by the read command is stored in the cache memory 132. The data required by the read command is called "read data" hereinafter. A cache miss means that the read command does not exist in the cache memory 132. When it is determined that a cache miss is generated, the read data is read from the logical volume 152 specified by the read command, and then stored in the cache memory 132.

The microprocessor 121 instructs the communication port package 110 to read the read data from the cache memory 132 and transmit the read data to the host 30 (S17). The microprocessor 112 of the communication port package 110 transmits the read data read from the cache memory 132, to the host 30 (S18).

Once the transmission of the read data is completed, the microprocessor 112 of the communication port package 110 receives a notification of the completion of transfer of the read data. The microprocessor 112 transfers this notification to the microprocessor package 120 (S19). This notification is registered in the command queue Q20 within the package memory 122 (S20).

The microprocessor 121 checks the command queue Q20 (S21), discovers the transfer completion notification, and copies this notification to the dedicated area 124. Based on this notification, the microprocessor 121 confirms that the transfer of the read data is ended normally. The microprocessor 121 transits "GOOD" to the communication port package 110 (S22). Note that the microprocessor 121 that executes the steps S13 to S17 might be different from the microprocessor 121 that executes the steps S21 and S22. In this case, the microprocessor 121 that executes the steps S21 and S22 notifies the microprocessor 121 that executes the steps S13 to S17, that the processing of the read command is completed.

The series of processing of S13 to S17, S21 and S22 that is executed in each unit is called a "job." Specifically, a plurality of read commands can be processed simultaneously. As with a write command described hereinafter, a plurality of jobs for processing write commands can be executed.

When the volume configuration information T30 within the shared memory 131 is not updated, the volume configuration information T20 within the package memory 122 can be used. Therefore, in the processing shown in FIG. 11, the microprocessor 121 processes the read command without accessing the shared memory 131.

Figure 12:
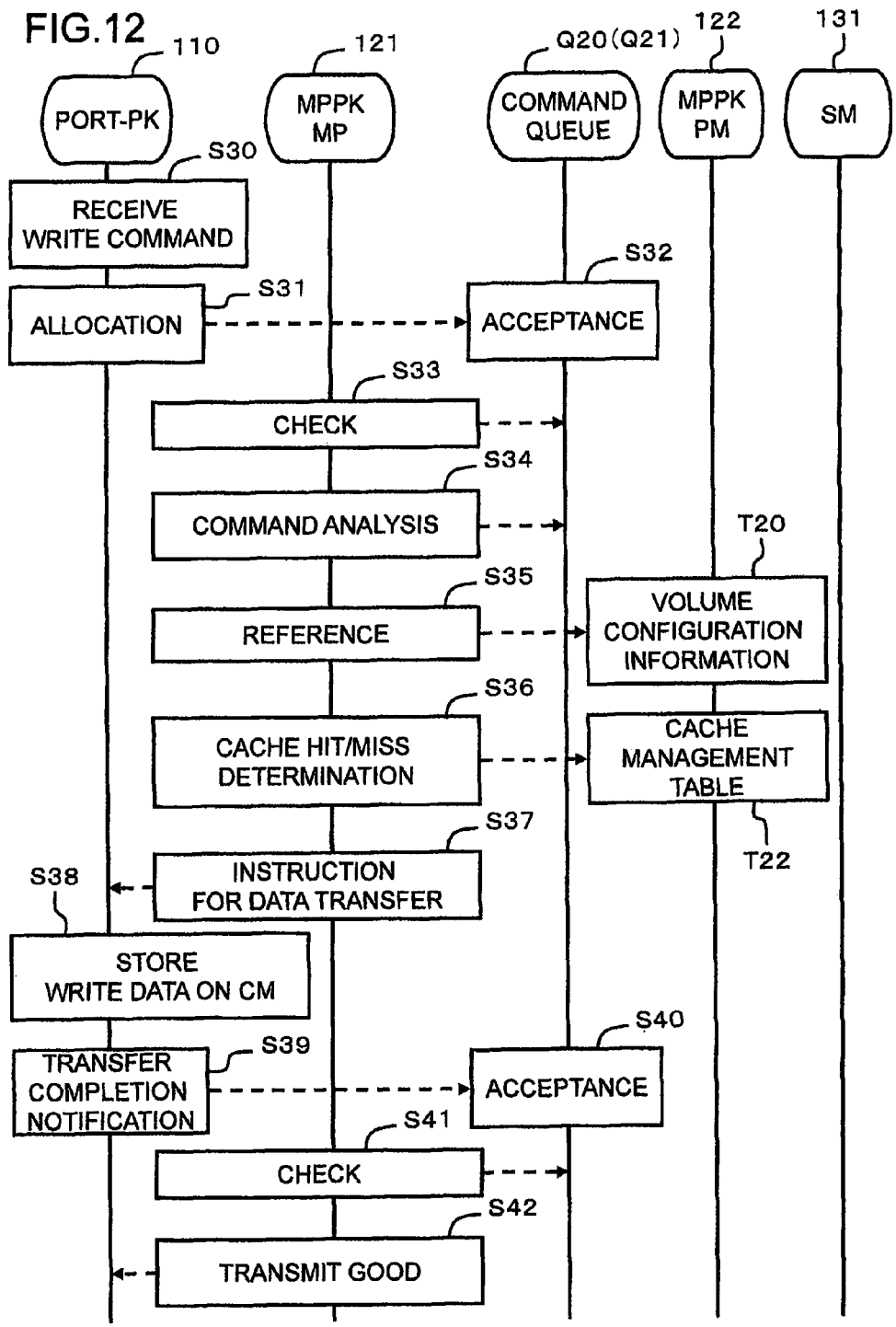
FIG. 12 A flowchart for processing a write command.

FIG. 12 is a flowchart showing how write processing is performed. The communication port package 110 receives a write command from the host 30 (S30). The communication port package 11 refers to the I/O allocation table T10, determines the microprocessor package 120 to which to transfer the write command, and transfers the write command to this microprocessor package 120 (S31).

The microprocessor package 120 registers the received write command in the command queue Q20 (S32). Out of the microprocessors 121 of the microprocessor package 120 receiving the write command, any one of the microprocessors 121 for performing the command processing (a microprocessor having the synchronous processing attribute or a microprocessor having the combination attribute) discovers the write command in the command queue Q20 (S33).

The microprocessor 121 that discovers the write command copies the write command in the dedicated area 124 and analyzes the write command (S34). As described above regarding the read processing, a write command issued by the mainframe is analyzed while having it stored in the package memory 122.

The microprocessor 121 refers to the volume configuration information T20 within the package memory 122 (S35). The microprocessor 121 refers to the cache management table T22 and determines whether a cache hit or a cache miss is generated (S36).

The microprocessor 121 requests the communication port package 110 to transfer the write data (S37). The communication port package 110 transfers and stores the write data from the host 30 into the cache memory 132 (S38).

The communication port package 110 transfer a notification of the completion of transfer of the write data to the microprocessor package 120 (S39). The microprocessor package 120 stores this notification in the command queue Q20 (S40). As with the read processing, the microprocessor 121 discovers this notification (S41) and transmits GOOD to the communication port package 110 (S42).

Figure 13:
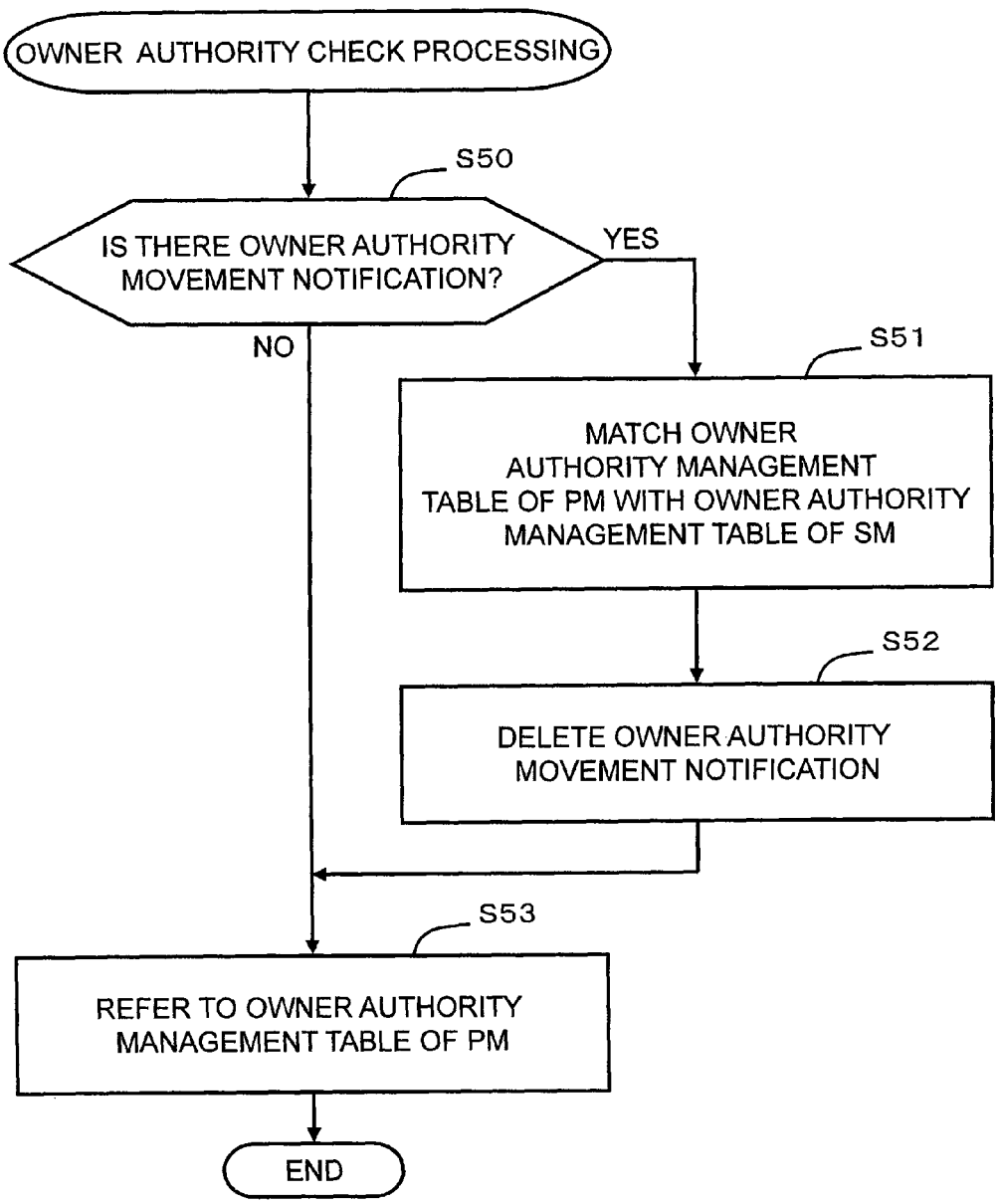
FIG. 13 A flowchart showing processing performed to confirm whether an owner authority management table within a package memory can be used or not.

FIG. 13 is a flowchart showing how processing for checking a movement of the owner authority is performed. The microprocessor 121 determines whether a notification of a movement of the owner authority is received or not (S50). When the owner authority management table T31 within the shared memory 131 is updated, the shared memory 131 notifies each package memory 122 that the owner authority management table T31 is updated. The microprocessor package 120 can be notified of the update of the owner authority management table T31, by, for example, setting a flag in a specific register within the microprocessor package 120, the flag indicating the update.

When the notification of the update is not received (S50: NO), the microprocessor 121 refers to the owner authority management table T21 within the package memory 122 (S53). When, on the other hand, the notification of the update is received (S50: YES), the microprocessor 121 access the shared memory 131. The microprocessor 121 reads the information stored in the owner authority management table T31 and stores the information in the owner authority management table T21 of the package memory 122 (S51). As a result, the contents of the owner authority management table T21 within the package memory 122 are updated to the latest ones. The microprocessor 121 deletes the notification of the update (S52) and refers to the owner authority management table T21 of the package memory 122 (S53).

Figure 14:
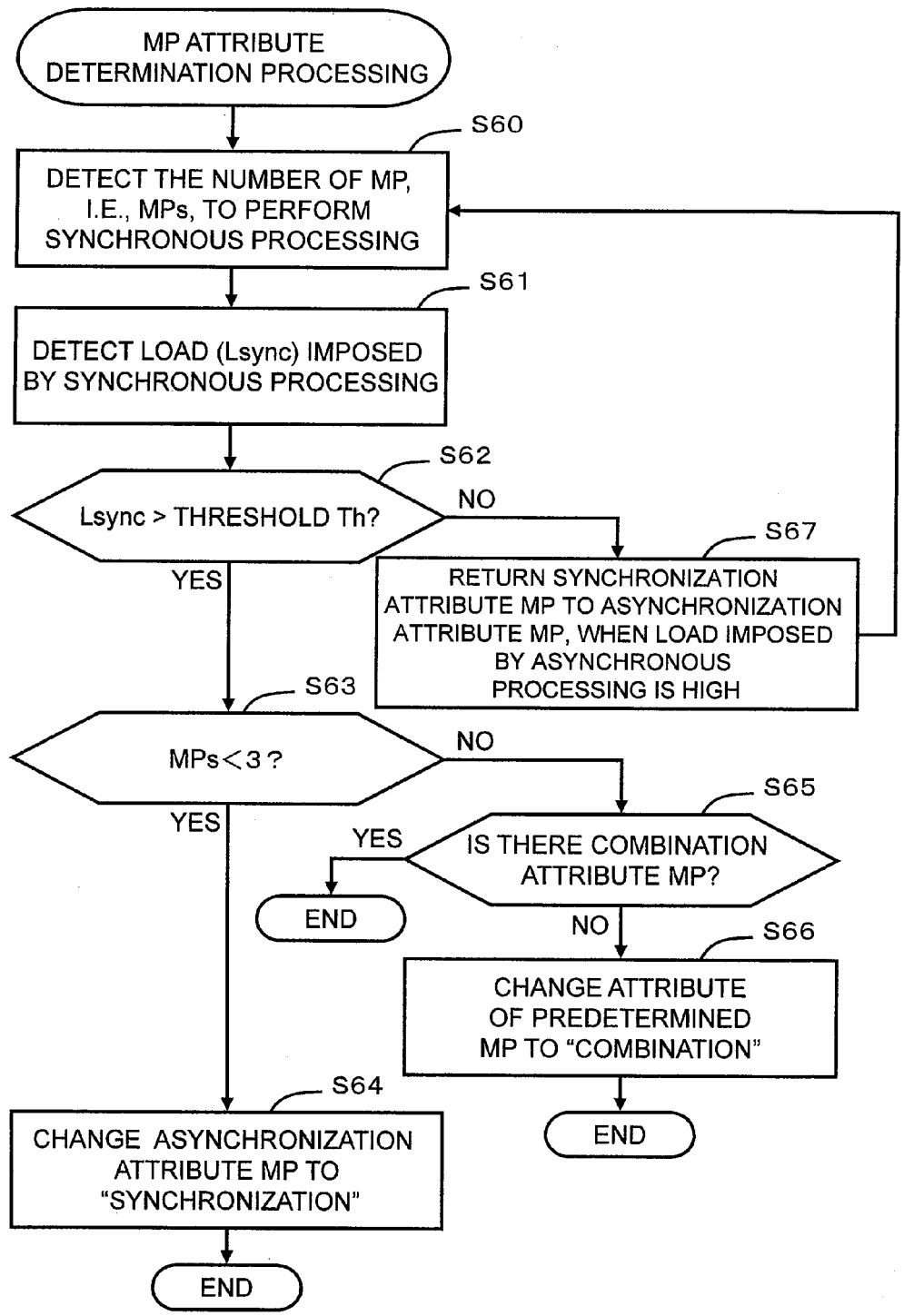
FIG. 14 A flowchart showing processing for determining the attributes of the microprocessors.

FIG. 14 is a flowchart showing how processing for controlling the attributes of the plurality of microprocessors 121 existing in the same microprocessor package 120 is performed. This processing is executed by any microprocessor 121 of the microprocessors 121 regularly or irregularly.

The microprocessor 121 detects the number of microprocessors 121 (MPs) having the synchronous processing attribute (S60). The microprocessor 121 detects the load imposed by the synchronous processing (Lsync) (S61). The load of the synchronous processing can be calculated based on, for example, the number of received commands, the command size, and the type of the command (either sequential access or random access).

The microprocessor 121 compares the load imposed by the synchronous processing (Lsync) with a predetermined threshold Th, and determines whether the load imposed by the synchronous processing (Lsync) exceeds the threshold Th (S62). When the load imposed by the synchronous processing (Lsync) exceeds the threshold Th (S62: YES), the microprocessor 121 determines whether the number MPs of microprocessors 121 having the synchronous processing attribute is less than three (S63).

In the present embodiment, the number of microprocessors 121 included in one microprocessor package 120 is four. Therefore, it is determined in step S63 whether or not the value of MPs is smaller than the value, which is smaller than the total number of microprocessors by a predetermined value. Here, the total number is "4" and the predetermined value "1."

When the number MPs of microprocessors 121 having the synchronous processing attribute is less than three (S63: YES), the microprocessor 121 selects any one microprocessor 121 from the microprocessors 121 having the asynchronous processing attribute. The microprocessor 121 changes the attribute of the selected microprocessor 121 to the synchronous processing attribute (S64). Thereafter, the present processing is performed again in predetermined timing. In this manner, when the number of commands to be processed increases, the number of microprocessors 121 having the synchronous processing attribute is increased.

The number MPs of the microprocessors 121 having the synchronous processing attribute increases gradually according to the number of commands and the like. When the number MPs of the microprocessors 121 having the synchronous processing attribute becomes three or above (S63: NO), the microprocessor 121 determines whether or not there is a microprocessor 121 having the combination attribute (S65).

As described above, the combination attribute is an attribute that can execute not only the command processing but also different processing other than the command processing. When there is no microprocessor 121 having the combination attribute (S65: NO), the microprocessor 121 changes the last microprocessor 121 having the asynchronous processing attribute to the combination attribute (S66). In the present embodiment, the microprocessor 121 that is set to have the combination attribute becomes the microprocessor 121 having the largest microprocessor number (#3), in order to change the attributes in order of increasing microprocessor number microprocessor number.

When the processing load of the microprocessor package 120 increases as described above, the attributes of three microprocessors 121 out of the four microprocessors 121 are set to the synchronous processing. The last microprocessor 121 is set to have the combination attribute. Accordingly, the processing other than the command processing can be performed.

When the command processing proceeds and the load Lsync imposed by the synchronous processing becomes equal to or less than the threshold Th (S62: NO), the microprocessor 121 determines whether or not to return the synchronous processing attribute to the asynchronous processing attribute (S67). For example, when the load of the microprocessor 121 having the asynchronous processing attribute is higher than a predetermined value, the attribute of the microprocessor 121 can be changed to the synchronous processing attribute. Alternatively, when a state in which the load Lsync imposed by the synchronous processing is equal to or lower than the threshold Th continues for a predetermined time period or longer, the microprocessor 121 can change the synchronous processing attribute of the microprocessor 121 to the asynchronous processing attribute.

Figure 15:
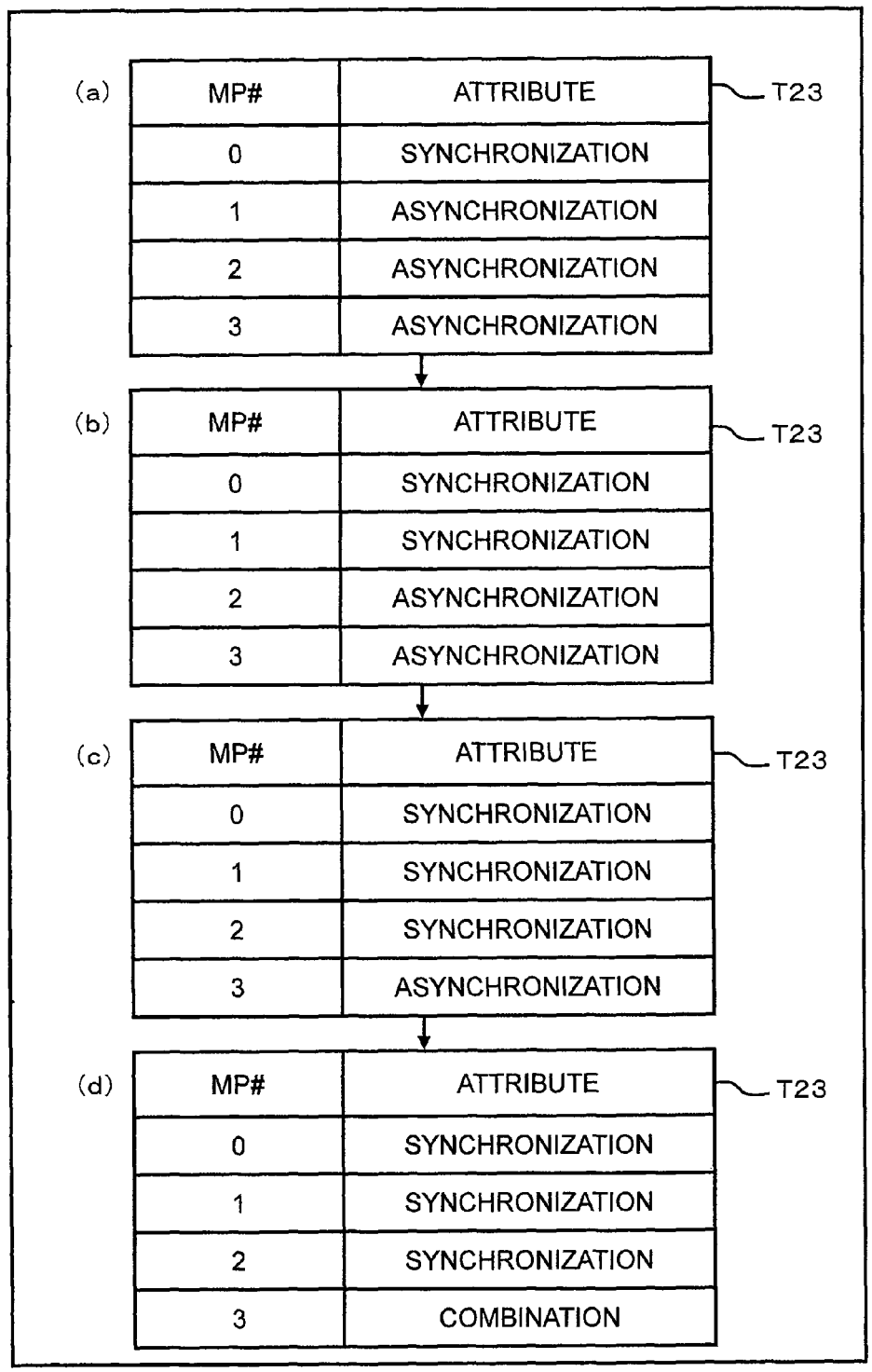
FIG. 15 A diagram showing changes in the attributes of the microprocessors within a package.

FIGS. 15 (15(a) to 15(d)) shows how the attribute of each microprocessor 121 is changed. FIG. 15(a) shows an initial state. In the initial state, only one microprocessor 121 is set to have the synchronous processing attribute, while the other three microprocessors 121 are set to have the asynchronous processing attribute.

FIG. 15(b) shows a state in which one microprocessor 121 having the synchronous processing attribute is added due to the increase in the load Lsync imposed by the synchronous processing. FIG. 15(c) shows a state in which another microprocessor 121 having the synchronous processing attribute is added. Therefore, out of the four microprocessors 121, the three microprocessors 121 are provided with the synchronous processing attribute. There is only one microprocessor 121 having the asynchronous processing attribute.

FIG. 15(d) shows a state in which the last microprocessor 121 having the asynchronous processing attribute is set to have the combination attribute. The microprocessor 121 whose attribute is changed to the combination attribute can execute both the command processing and the different processing (rearrangement processing for rearranging the volume configuration information, diagnosis processing, etc.).

Figure 16:
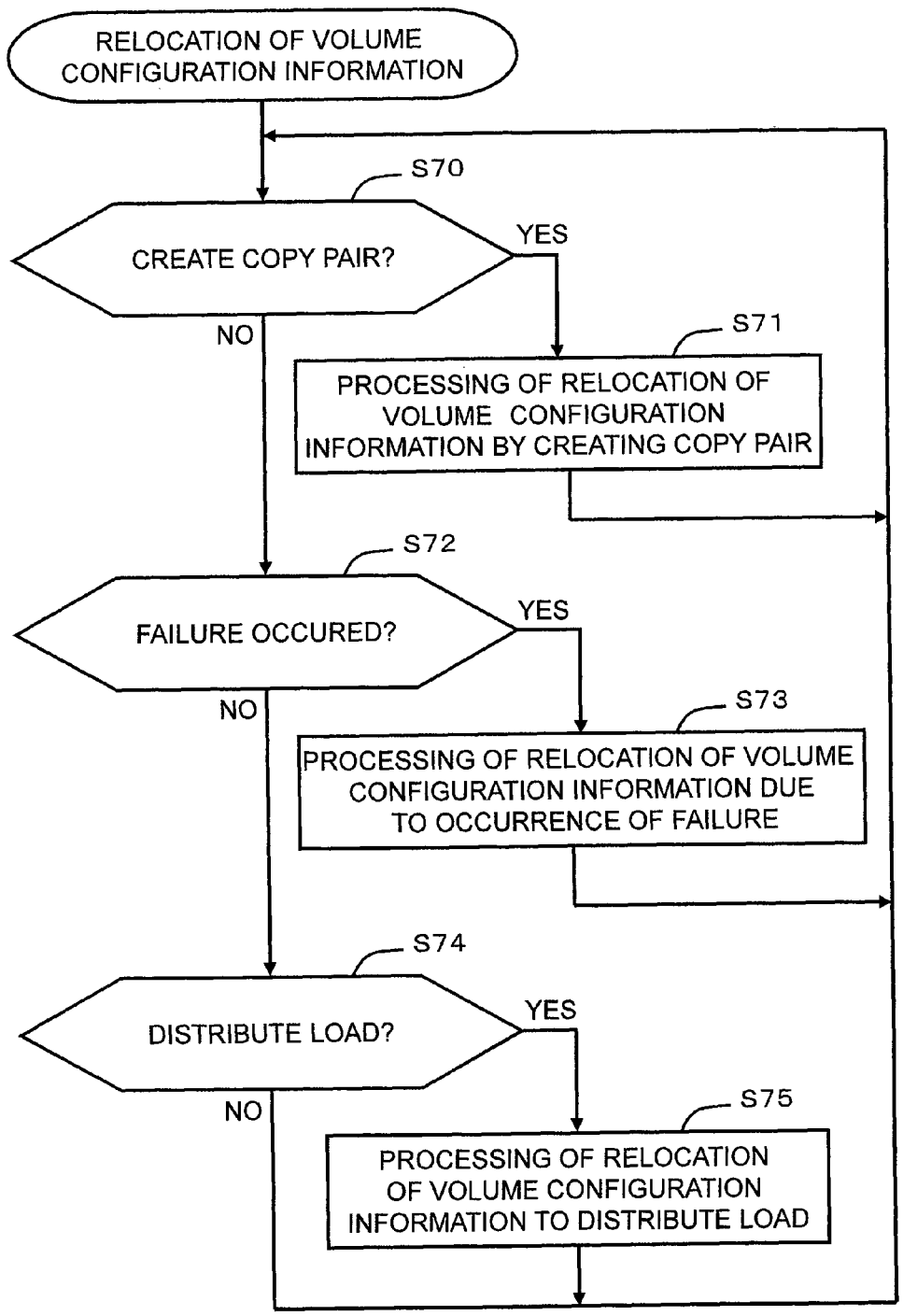
FIG. 16 A flowchart showing the overall processing performed for rearranging the volume configuration information.

FIG. 16 shows an overview of the processing for rearranging the volume configuration information to an appropriate microprocessor package 120. The processing for rearranging the volume configuration information is executed, when a predetermined condition is established, as described hereinafter. The present processing is executed by either one of a microprocessor 121 having the asynchronous attribute processing or the microprocessor 121 having the combination attribute.

The microprocessor 121 determines whether creation of a copy pair is instructed or not (S70), and, when an instruction to create a copy pair is issued (S70: YES), executes the rearrangement processing for rearranging the volume configuration information in response to the creation of a copy pair (S71). The processing of step S71 is described hereinafter with reference to FIGS. 17 to 20.

When the instruction to create a copy pair is not issued (S70: NO), the microprocessor 121 determines whether or not a failure is generated in the microprocessor package 120 (S72). When it is determined that a failure is generated in the microprocessor package 120 (S72: YES), the microprocessor 121 starts the rearrangement processing for rearranging the volume configuration information in response to the generation of the failure (S73). The processing of step S73 is described hereinafter with reference to FIGS. 21 to 25.

Figure 26:
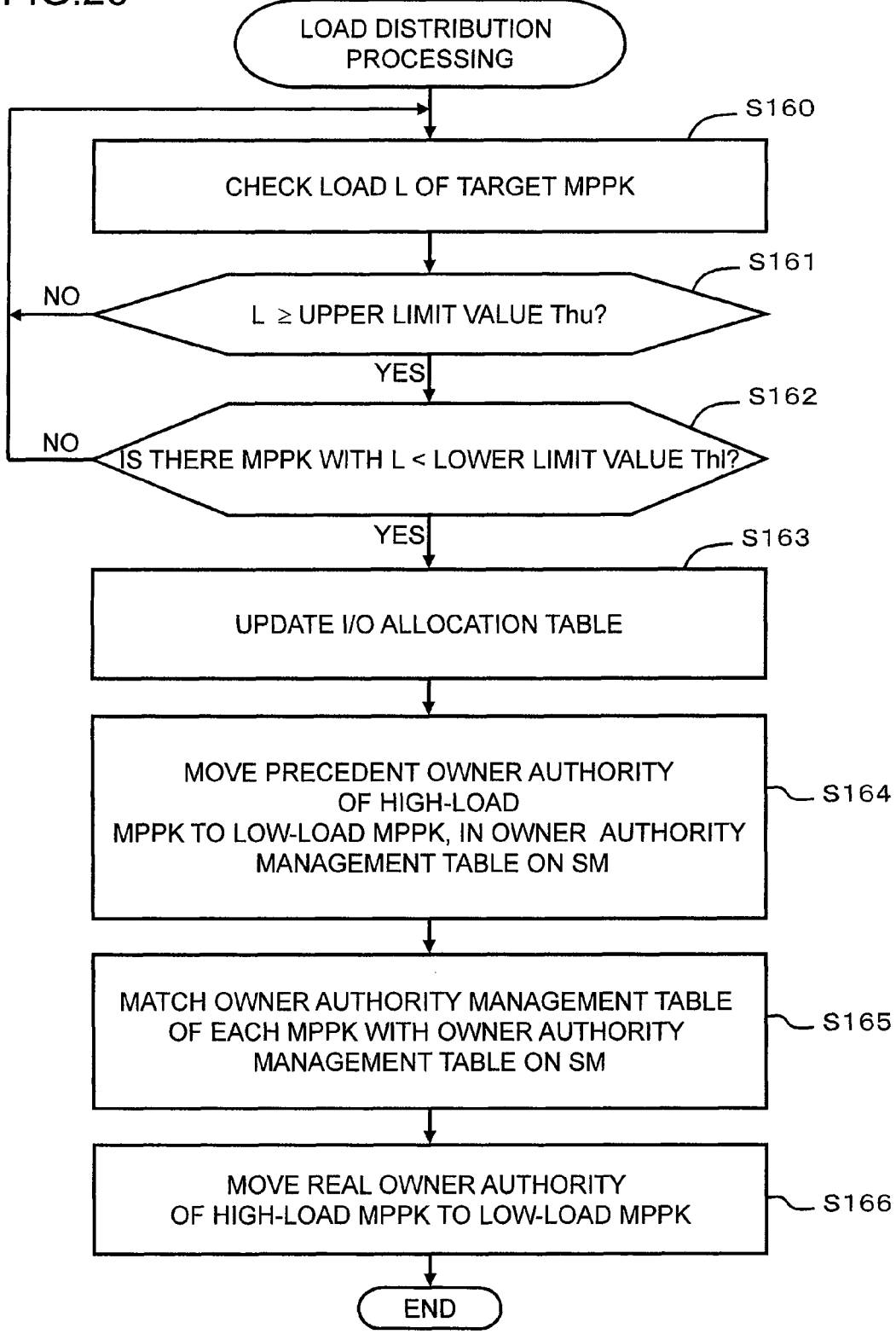
FIG. 26 A flowchart showing processing performed for moving the precedent owner authority upon increase in load on each microprocessor package.

When no failure is generated in the microprocessor package 120 (S72: NO), the microprocessor 121 determines whether to perform load distribution (S74). When performing load distribution (S74: YES), the microprocessor 121 starts the rearrangement processing for rearranging the volume configuration information, in response to the load distribution (S75). The processing of step S75 is described hereinafter with reference to FIG. 26.

Note that three types of cases to rearrange the volume configuration information are described in FIG. 16, but the volume configuration information may be rearranged in response to other cases. In addition, the order of determination is not limited to the example shown in FIG. 16. The microprocessor that executes the processing for rearranging the volume configuration information has either the asynchronous processing attribute or the combination attribute.

Figure 17:
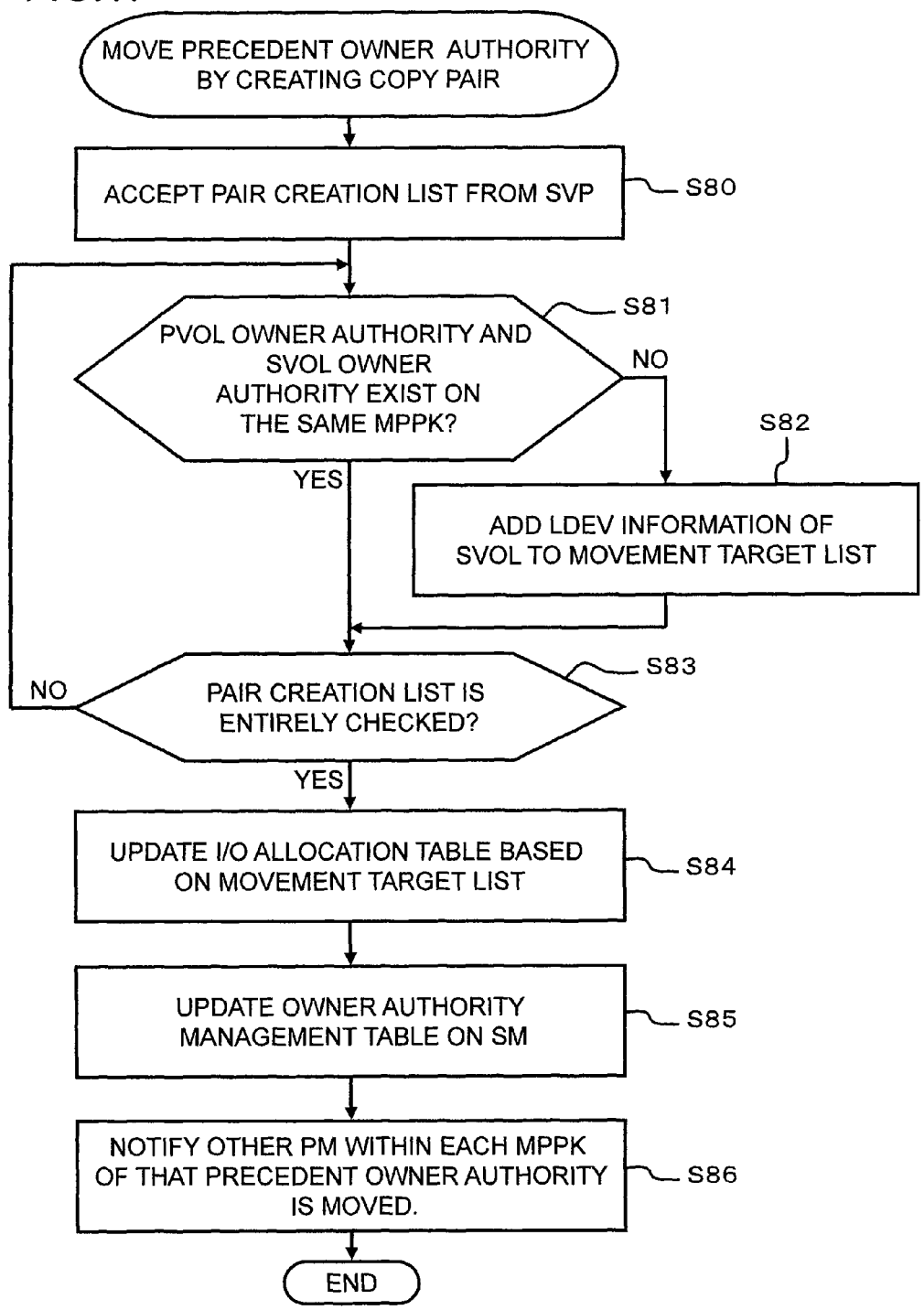
FIG. 17 A flowchart showing processing performed for moving precedent owner authority upon creation of a copy pair.

FIG. 17 is a flowchart showing a part of the processing for rearranging the volume configuration information in response to the generation of a copy pair. In the flowchart of FIG. 17, the precedent owner authority is moved prior to moving the volume configuration information.

A user (system manager) uses the management terminal 20 to issue the instruction to create a copy pair. The microprocessor 121 accepts a pair creation list from the service processor 170 (S80). The pair creation list has described thereon at least the LDEV number of a primary volume, which is one of the logical volumes 152 creating a copy pair, and the LDEV number of a sub-volume, which is the other logical volume 152 forming the copy pair.

The microprocessor 121 analyzes the pair creation list and determines whether or not the owner authority of the primary volume (PVOL) and the owner authority of the sub-volume (SVOL) are managed by the same microprocessor package 120 (S81). When the owner authority of the primary volume and the owner authority of the sub-volume do not exist in the same microprocessor package 120 (S81: NO), the microprocessor 121 records the owner authority of the sub-volume into a movement target list (S82). The movement target list is a list for managing the volume configuration information of the logical volume to be moved. The volume configuration information is combined with the real owner authority and can be arranged only in the microprocessor package 120 in which the real owner authority exists.

The microprocessor 121 determines whether all copy pairs described in the pair creation list are checked or not (S83). This checking means the determination performed in step S81 and the creation of the movement target list performed in step S82. When there remains an unchecked copy pair (S83: NO), the microprocessor 121 returns to step S81.

When checking all of the copy pairs described in the pair creation list is completed (S83: YES), the microprocessor 121 updates the I/O allocation table T10 based on the movement target list (S84). The microprocessor 121 moves the precedent owner authority of the sub-volume to the microprocessor package 120 of the primary volume. As a result, the command relating to the sub-volume is transferred to the microprocessor package 120 managing the primary volume.

Subsequently, the microprocessor 121 updates the owner authority management table T31 within the shared memory 131 (S85). In the owner authority management table T31 on the shared memory 131, the microprocessor 121 moves the precedent owner authority of the sub-volume to the microprocessor package 120 managing the primary volume. The microprocessor 121 notifies all of the other microprocessor packages 120 that the owner authority management table T31 within the shared memory 131 is updated (S86). This notification is an update notification determined in step S50 shown in FIG. 13.

Figure 18:
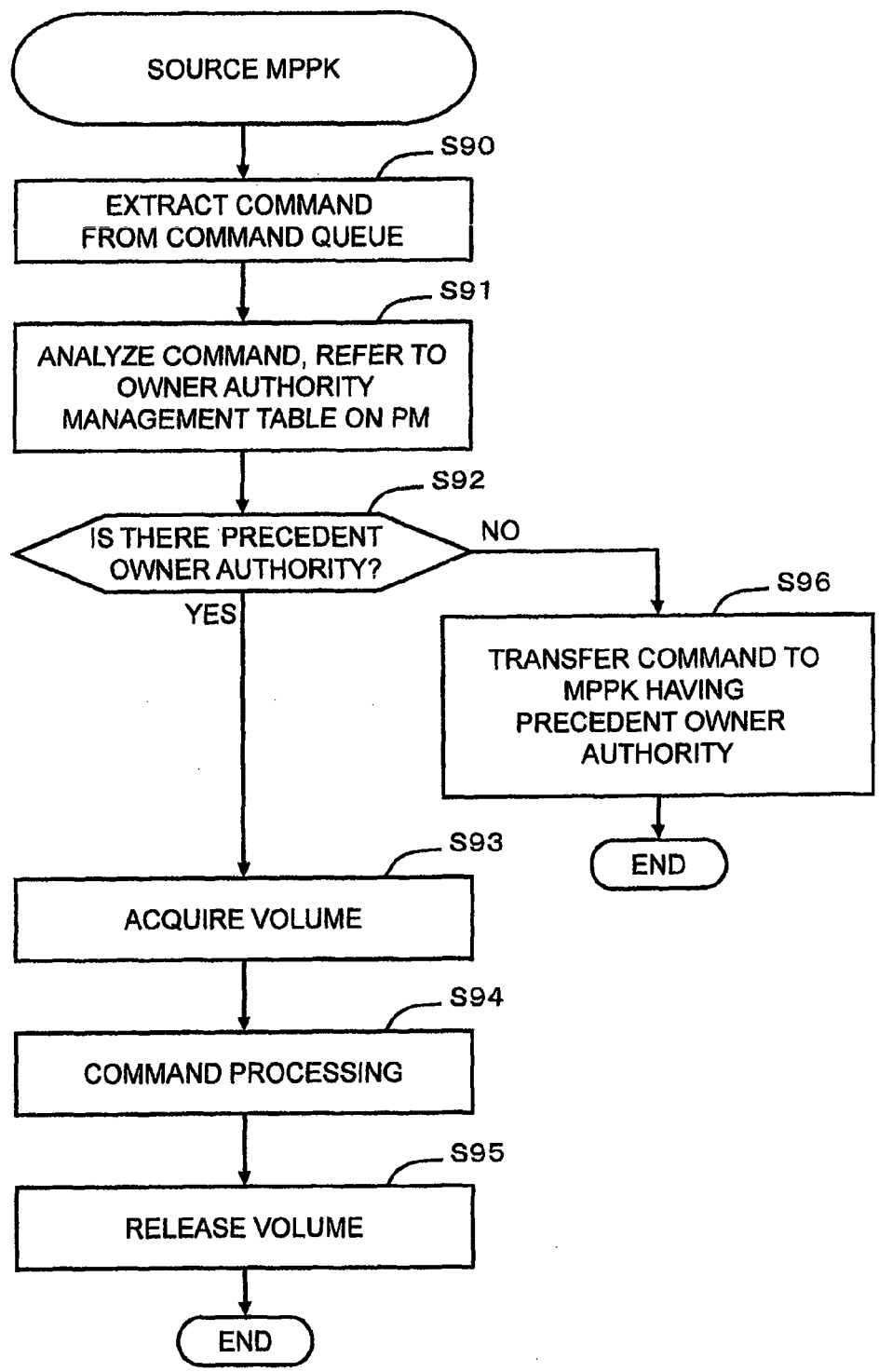
FIG. 18 A flowchart showing processing of a source microprocessor package.

FIG. 18 shows the processing performed by the microprocessor package 120, which is the source of the volume configuration information. Hereinafter, the microprocessor 121 of the source microprocessor package 120 is sometimes called "source microprocessor 121" and the microprocessor 121 of the destination microprocessor package 120 "destination microprocessor 121."

The source microprocessor 121 extracts one of the commands from the command queue Q20 (S90), analyzes this command, and refers to the owner authority management table T21 within the package memory 122 (S91).

The source microprocessor 121 determines whether the logical volume 152 used for processing the command possesses the precedent owner authority or not (S92). The precedent owner authority might be moved prior to the real owner authority, but the other way around does not take place. In other words, when the source microprocessor 121 has the real owner authority, it means that this source microprocessor 121 also has the precedent owner authority.

When the source microprocessor 121 has the precedent owner authority (S92: YES), the source microprocessor 121 secures the logical volume 152 as the processing target (S93), processes the command (S94), and then releases this logical volume 152 (S95).

When the source microprocessor 121 does not have the precedent owner authority (S92: NO), the command that is extracted from the command queue Q20 in step S90 is transferred to the destination microprocessor package 120 (S96). Since the precedent owner authority is already arranged in the destination microprocessor package 120, the command relating to the logical volume 152 to be moved is transmitted to the destination microprocessor package 120. Although this command can be processed because the source microprocessor package 120 has the real owner authority, this command is transferred to the destination microprocessor package 120. Since the destination microprocessor package 120 does not acquire the real owner authority at this moment, the destination microprocessor package 120 cannot process the transferred command.

Figure 19:
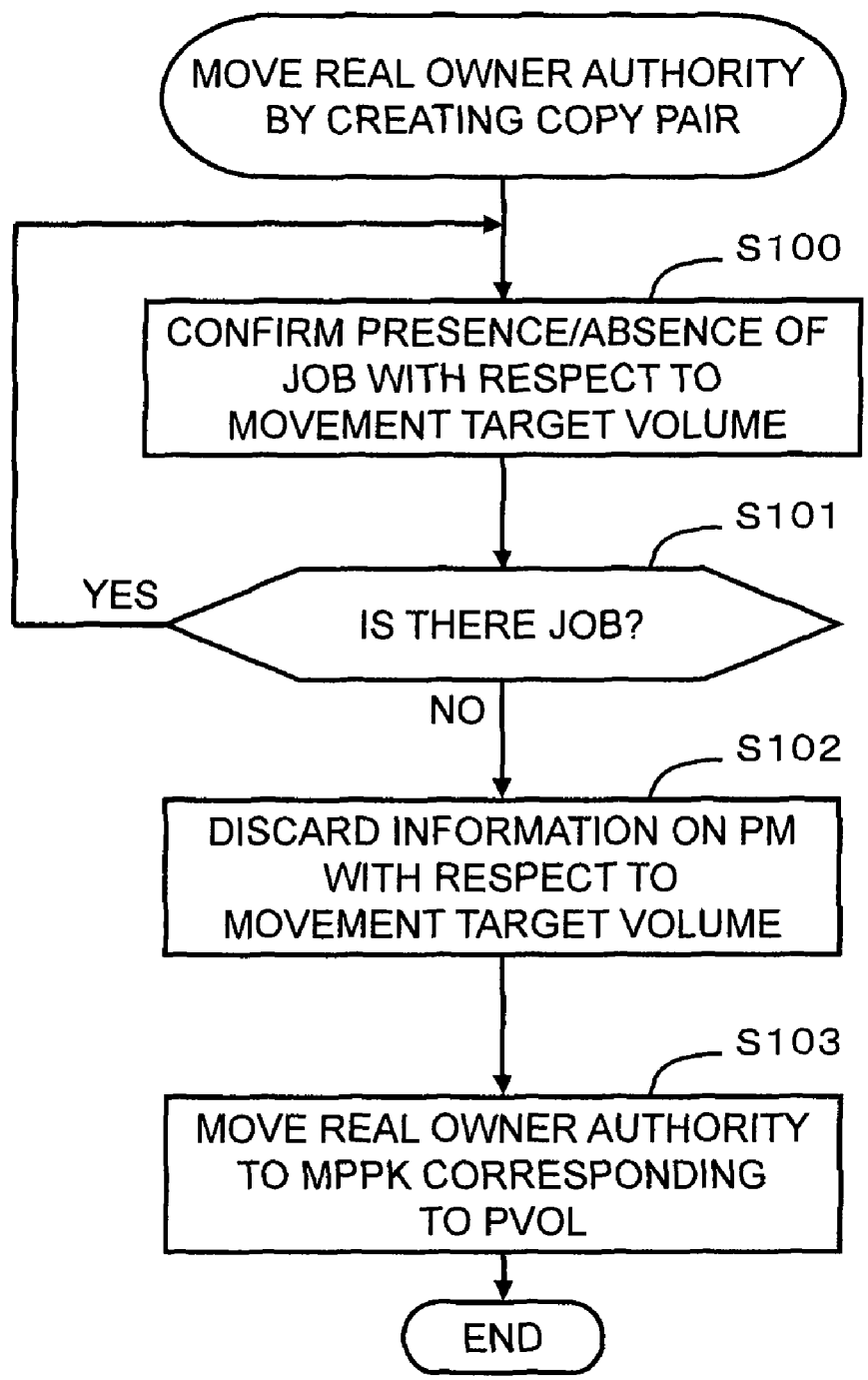
FIG. 19 A flowchart showing processing performed for moving real owner authority.

FIG. 19 is a flowchart showing the processing for moving the real owner authority. This processing is executed periodically by the source microprocessor 121. The source microprocessor 121 refers to the job queue Q23 to check the presence/absence of a job relating to the logical volume 152 to be moved (S100).

When there remains a job that uses the logical volume 152 to be moved (S101: YES), the processing is returned to step S100. When there does not remain a job that uses the logical volume 152 to be moved (S101: NO), the source microprocessor 121 discards the management information relating to the logical volume 152 to be moved within the package memory 122 (S102). Examples of the management information relating to the logical volume 152 to be moved include the volume configuration information T20 and the cache management table T22.

Finally, the source microprocessor 121 moves the real owner authority relating to the logical volume 152 to be moved, to the destination microprocessor package 120 (S103). The source microprocessor 121 updates the owner authority management table T31 stored in the shared memory 131, such that the real owner authority is moved from the source microprocessor package 120 to the destination microprocessor package 120.

Figure 20:
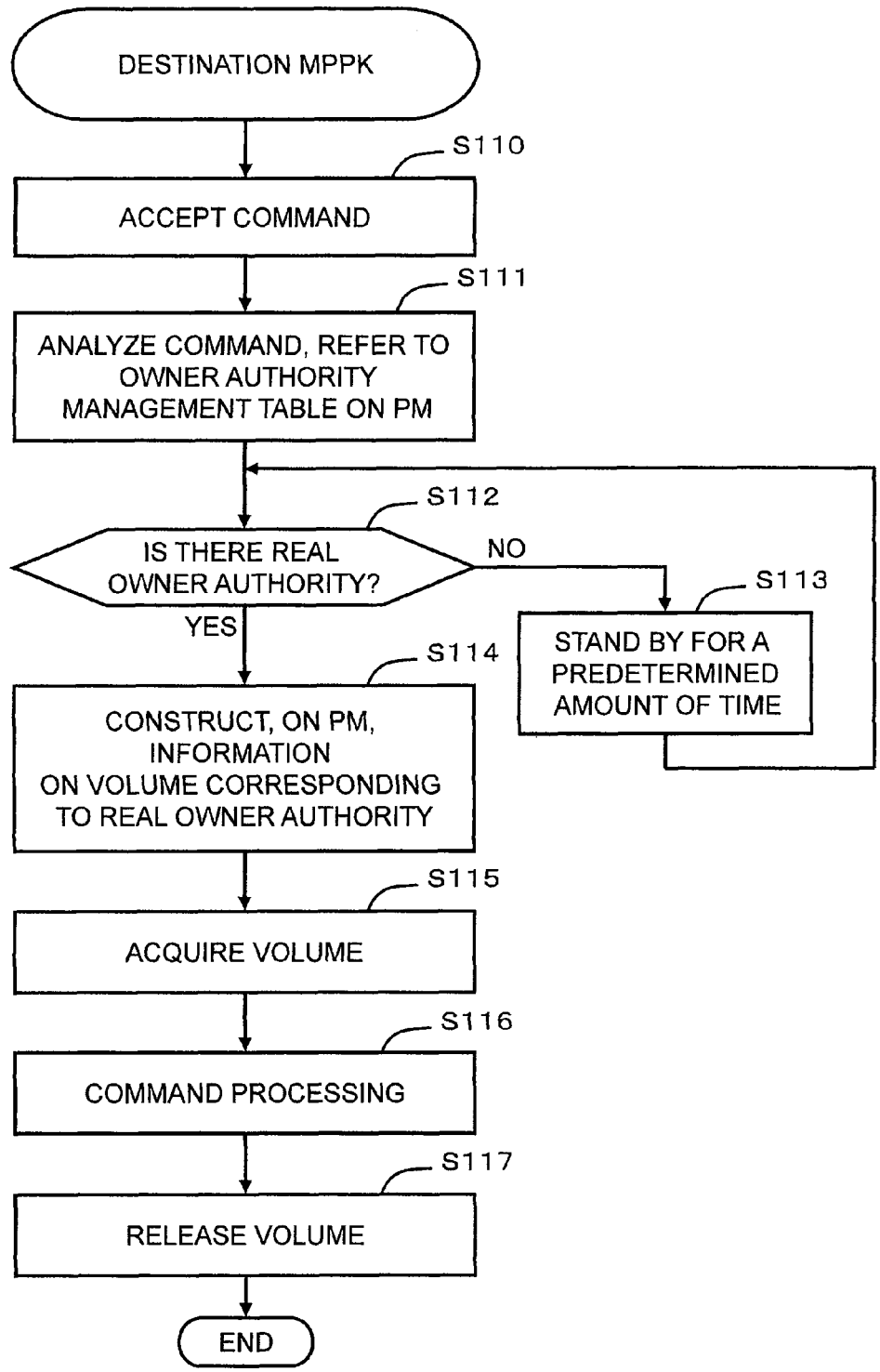
FIG. 20 A flowchart showing processing of a destination microprocessor package.

FIG. 20 shows the processing of the destination microprocessor package 120. The destination microprocessor package 121 accepts a command from either the communication port package 110 or the source microprocessor package 120 (S110). The accepted command is registered in the command queue Q20.

The destination microprocessor 121 analyzes the accepted command and refers to the owner authority management table T21 within the package memory 122 (S111). The destination microprocessor 121 determines whether or not it possesses the real owner authority of the logical volume 152 to be used for processing this command (S112).

When the destination microprocessor package 120 does not have the real owner authority relating to the logical volume 152 to be moved (S112: NO), the destination microprocessor 121 stands by for a predetermined time period (S113). Specifically, the destination microprocessor 121 stands by until the real owner authority is moved from the source microprocessor package 120.

When the destination microprocessor package acquires the real owner authority (S112: YES), the destination microprocessor 121 constructs the management information on the logical volume 152 to be moved, within the package memory 122 (S114). In other words, the destination microprocessor 121 accesses the volume configuration information T31 and the cache management table T32 in the shared memory 131 to acquire, therefrom, the information relating to the logical volume 152 to be moved. Based on the information acquired from the shared memory 131, the destination microprocessor 121 constructs, within the package memory 122, the volume configuration information T20 and the cache management table T22 relating to the logical volume 152 to be moved.

The destination microprocessor 121 registers the job number relating to the logical volume 152 in the job queue Q23 and thereby secures this logical volume 152, the logical volume 152 being used for processing the command (S115). The destination microprocessor 121 then processes the command by using this logical volume 152 (S116). The destination microprocessor 121 releases this logical volume 152 after completing the command processing (S117). The above is the description of the rearrangement of the volume configuration information performed in response to the [creation of] a copy pair. Next, rearranging the volume configuration information in response to the occurrence of a failure is described with reference to FIGS. 21 to 25.

Figure 21:
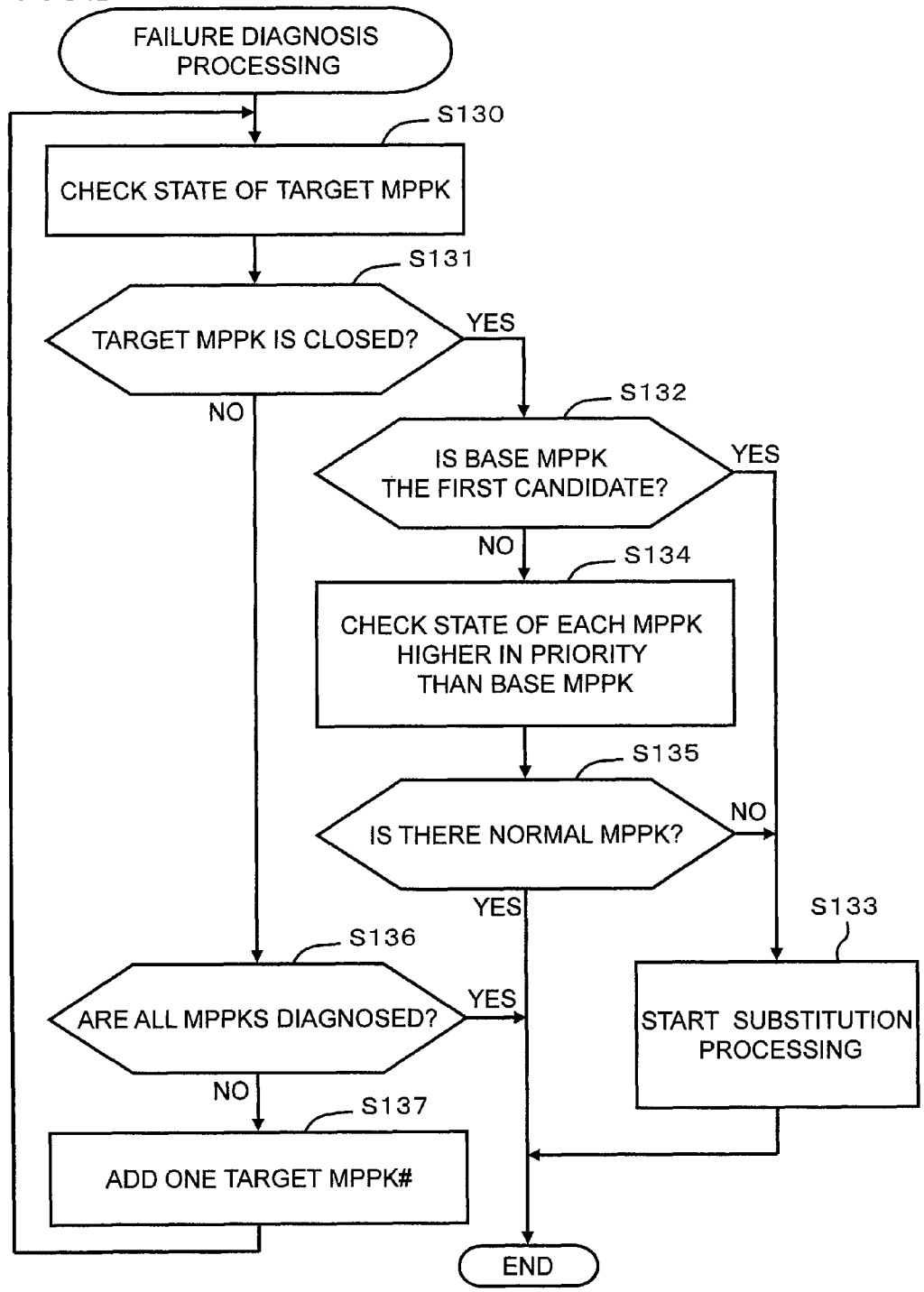
FIG. 21 A flowchart showing processing performed for checking whether a failure is generated in each microprocessor package or not.

FIG. 21 is a flowchart showing the processing performed for diagnosing the presence/absence of a failure in each microprocessor package 120. This processing is executed periodically by any of the microprocessors 121 having the asynchronous processing attribute or the combination attribute.

Note that the four microprocessors 121 included in each microprocessor package 120 monitor the conditions of each other. When a failure is generated in any of the microprocessors 121, the other normal microprocessors 121 perform the processing on behalf of the microprocessor 121 having the failure. If all of the microprocessors 121 of one microprocessor package 120 cease due to the failure, the entire microprocessor package 120 is blocked. Blocking means to stop using the package having the failure and separate the package from the system.

The microprocessor 121 checks the condition of the microprocessor package 120 to be diagnosed (S130). The microprocessor 121 determines whether the microprocessor package 120 to be diagnosed is blocked (closed) or not (S131).

When the microprocessor package 120 to be diagnosed is normal (S131: NO), the microprocessor 121 determines whether or not all of the microprocessor packages 120 within the storage control apparatus 10 are diagnosed (S136). All of the microprocessor packages 120 precisely indicate the microprocessor packages 120 other than the microprocessor package 120 to which this microprocessor 121 belongs.

When there still remains an undiagnosed microprocessor package 120 (S136: NO), the microprocessor 121 adds one to the package number of the microprocessor package 120 to be diagnosed (S137), and returns to step S130. When there is no undiagnosed microprocessor package 120 (S136: YES), this processing is ended.

When the microprocessor package 120 to be diagnosed is blocked (S131: YES), the microprocessor package 121 refers to the table T33 shown in FIG. 24, and determines whether the microprocessor package 120 to which this microprocessor 121 belongs is the first candidate of the substitution microprocessor package or not (S132). The table T33 is described hereinafter.

The substitution microprocessor package indicates a microprocessor package that performs the command processing on behalf of the blocked microprocessor package (to be also referred to as "failure-generated package"). This substituting microprocessor package is also called "substitution microprocessor package."

When the microprocessor package 120 to which the microprocessor 121 belongs is the first candidate of the substitution package (S132: YES), the microprocessor 121 starts substitution processing (S133). The detail of the substitution processing is described hereinafter with reference to FIG. 22.

In a case in which the microprocessor package 120 to be diagnosed is blocked (S131: YES), when the microprocessor package 120 to which the microprocessor 121 belongs is not the first candidate of the substitution package (S132: NO), the microprocessor 121 checks the condition of the other microprocessor packages 120 (S134). The other microprocessor packages 120 indicate the microprocessor packages 120 other than the microprocessor package 120 to which the microprocessor 121 executing the present processing belongs, as well as the failure-generated package.

The microprocessor 121 determines whether there exists a normal microprocessor 120 in the other microprocessor packages 120 (S135). When the normal microprocessor package 120 exists (S135: YES), this microprocessor package 120 has a higher priority of a substitution candidate than the microprocessor package 120 to which the microprocessor 121 belongs. Therefore, this processing is ended. Thereafter, when the microprocessor 121 within the microprocessor package 120 that is discovered in step S135 executes the processing shown in FIG. 21, the microprocessor package 120 discovered in step S135 starts the substitution processing (S133).

When there is no normal microprocessor package 120 (S135: NO), the microprocessor 121 starts the substitution processing (S133). This is because there does not exist the microprocessor package 120 that is operated normally, other than the microprocessor package 120 to which the microprocessor 121 belongs.

Figure 22:
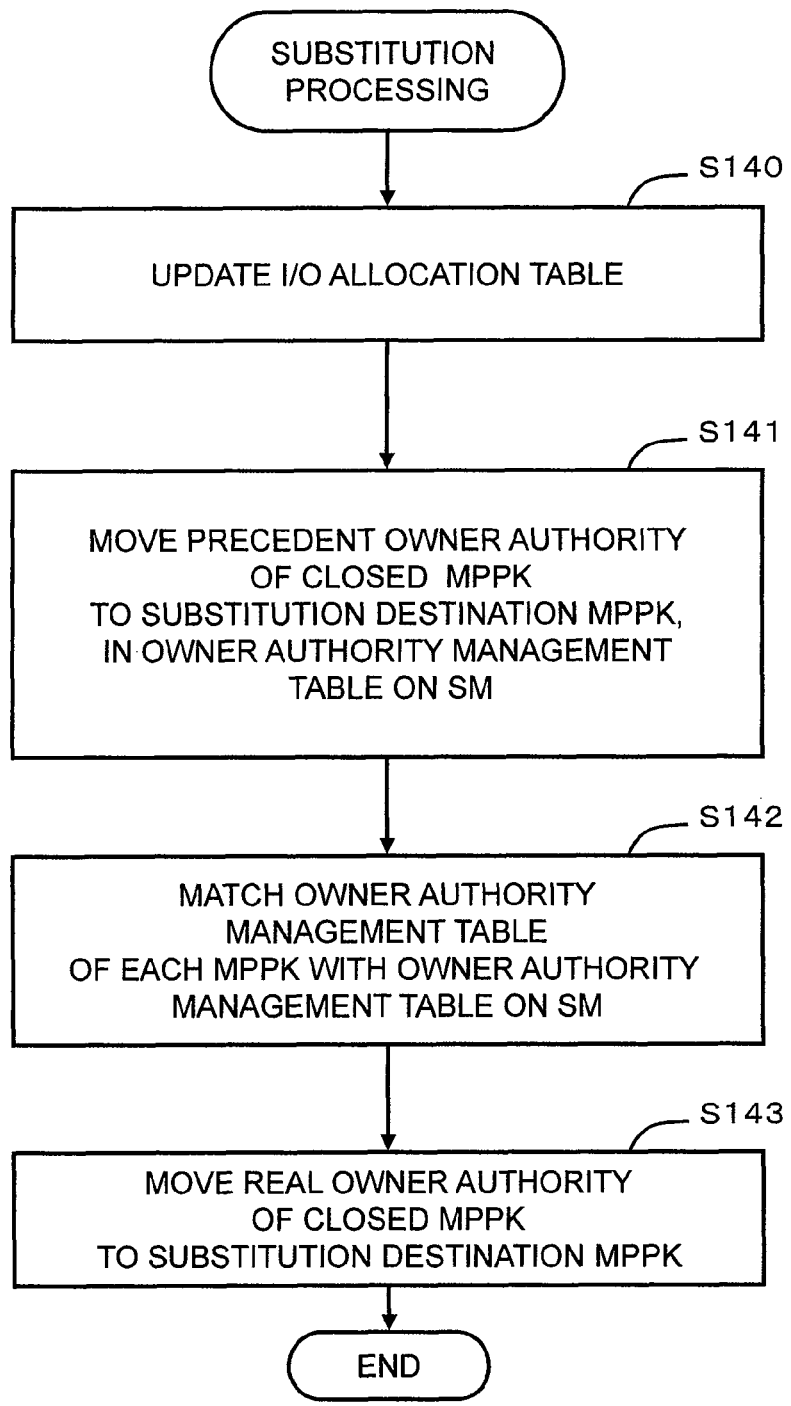
FIG. 22 A flowchart in which a normal microprocessor package is in charge of processing on behalf of the microprocessor that is stopped due to the failure.

FIG. 22 is a flowchart showing the substitution processing. This processing is executed by the microprocessor 121 within the substitution package 120 (the microprocessor having either the asynchronous processing attribute or the combination attribute).

The microprocessor 121 updates the I/O allocation table T10 within the communication port package 110 (S140). Specifically, the microprocessor 121 moves the precedent owner authority relating to the logical volume 152 managed by the failure-generated package, to the substitution package.

The microprocessor 121 updates the owner authority management table T31 within the shared memory 131 (S141). In other words, in the owner authority management table T31, the microprocessor 121 registers the package number of the substitution package in the column C312 for the precedent owner authority of the logical volume 152 managed by the failure-generated package.

The other microprocessor packages 120 (all of the microprocessor packages other than the substitution package and the failure-generated package) update the owner authority management table T21 within the package memory 122 in accordance with the update of the owner authority management table T31 within the shared memory 131 (S142). In other words, the contents of the owner authority management table T21 are conformed to the contents of the owner authority management table T31 within the shared memory 131.

In the owner authority management table T31 within the shared memory 131, the microprocessor 121 registers the package number of the substitution package in the column C311 for the real owner authority of the logical volume 152 managed by the failure-generated package (S143). Thereafter, the other microprocessor packages 120 are notified of the fact that the owner authority management table T31 is updated, and the owner authority management table T21 of each package memory 122 is also updated.

Figure 23:
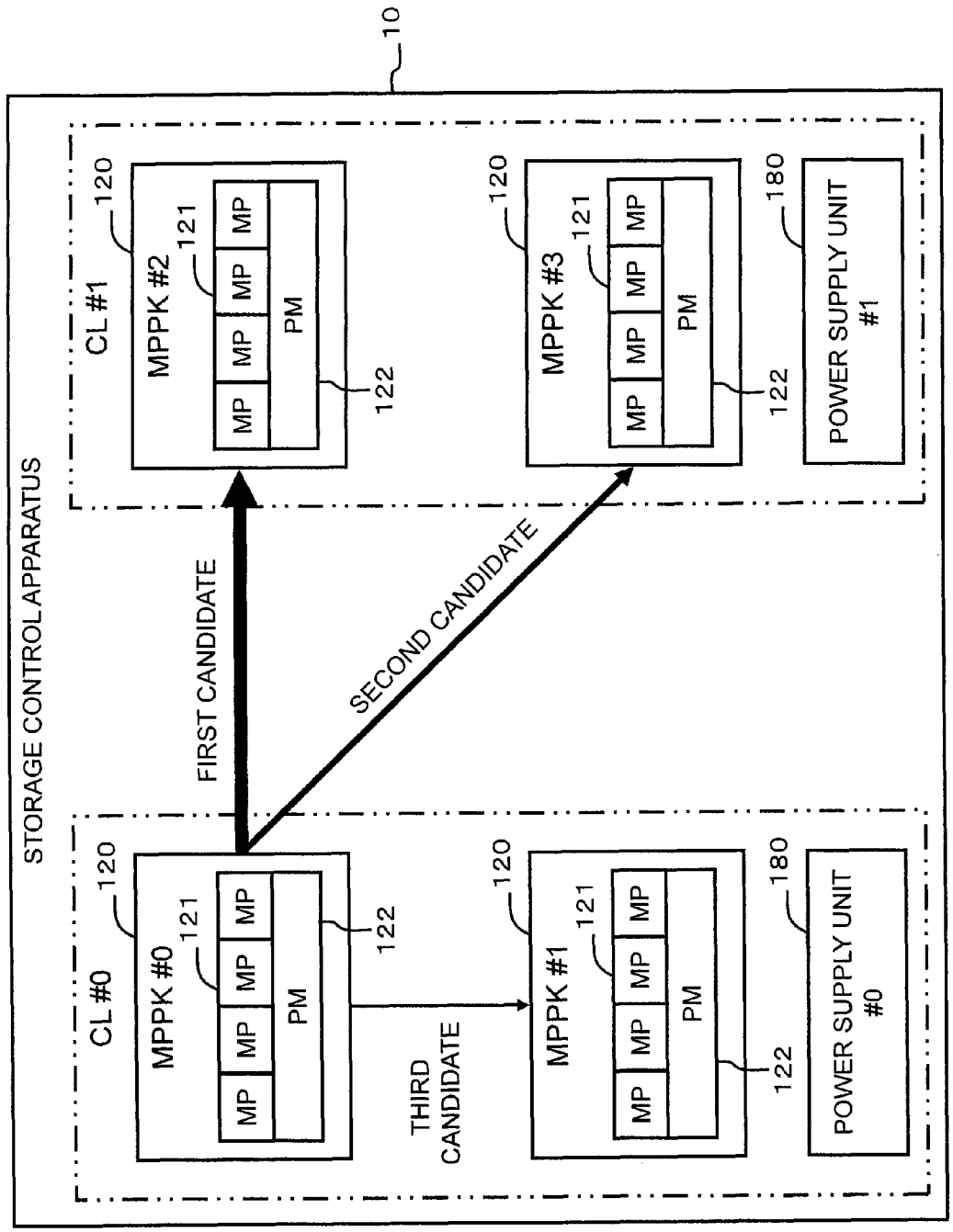
FIG. 23 A diagram showing a priority order of substituting microprocessor packages.

FIG. 23 schematically shows a priority order of the priority order of candidates for the substitution packages. The storage control apparatus 10 is provided with a plurality of (two) clusters CL#0, CL#1. A plurality of microprocessor packages 120 and a power supply unit 180 belong to each of the clusters CL#0, CL#1. In the example shown in FIG. 23, the microprocessor packages 120 (#0, #1) and the power supply unit 180 (#0) belong to the cluster CL#0. The microprocessor packages 120 (#2, #3) and the power supply unit 180 (#1) belong to the cluster CL#1.

The priority order of candidates for the substitution packages is determined based on the perspective of keeping the reliability as much as possible. Therefore, the microprocessor packages 120 of one of the clusters have a higher priority order than the microprocessor packages 120 of the other cluster.

As shown in FIG. 23, in the present embodiment, therefore, the relevant microprocessor package 120 (for example, the microprocessor package having a low package number) out of the microprocessor packages 120 of the former cluster mentioned above is provided with the highest priority. The second priority is provided to the other microprocessor package 120 of the former cluster mentioned above. The third priority is provided to the other microprocessor package 120 of the latter cluster mentioned above.

FIG. 24 shows the table T33 for managing the priority order of the candidates for the substitution packages. This management table T33 associates, for example, the package number C330 of a target microprocessor package, the package number C331 of the first candidate for the substitution package, the package number C332 of the second candidate, and the package number C333 of the third candidate with one another, and manages these package numbers. The microprocessor 121 that executes the processing shown in FIG. 21 can check the priority order of the substitution packages by referring to the table T33 shown in FIG. 24.

Figure 25:
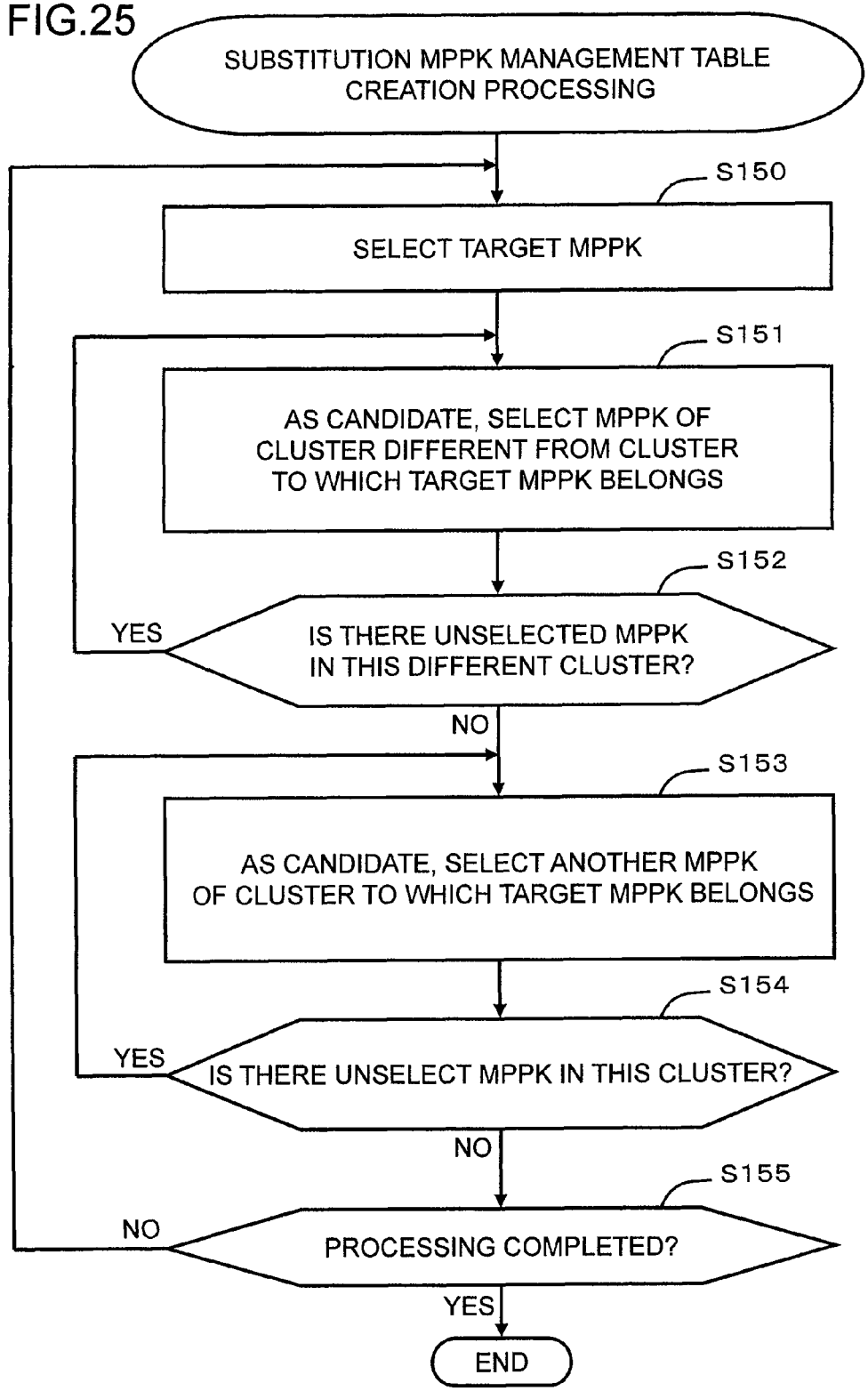
FIG. 25 A flowchart showing processing performed for creating the table shown in FIG. 24.

FIG. 25 is a flowchart showing the processing for creating the management table T33 shown in FIG. 24. This processing is executed by any of the microprocessors 121 when, for example, the storage control apparatus 10 is activated or when the configuration of the storage control apparatus 10 is changed.

The microprocessor 121 selects one of the microprocessor packages 120 as a target of this processing (S150). The microprocessor 121 selects, as the first candidate, the microprocessor package 120 of the cluster that is different from the cluster to which the abovementioned selected target microprocessor package 120 belongs (S151).

The microprocessor 121 determines whether or not there is an unselected microprocessor package 120 in the different cluster (S152). When there is an unselected microprocessor package 120 (S152: YES), the microprocessor 121 returns to step S151 and selects this unselected microprocessor package 120 as the second candidate.

When there is no unselected microprocessor package 120 within the different cluster (S152: NO), the microprocessor 121 selects, as the third candidate, another microprocessor package 120 within the cluster to which the target microprocessor package 120 belongs (S153). The microprocessor 121 determines whether or not there is an unselected microprocessor package 120 in the cluster to which the target microprocessor package 120 belongs (S154). When there is an unselected microprocessor package 120 (S154: YES), the microprocessor 121 returns to step S153 and selects this unselected microprocessor package 120 as the fourth candidate.

The microprocessor 121 determines whether or not the priority order of the substitution packages is set for all of the microprocessor packages 120 (S155). When there is an unselected microprocessor package 120 (S155: NO), the microprocessor 121 adds one to the package number of the target microprocessor package and returns to step S150. When the priority order of the substitution packages is set for all of the microprocessor packages 120 (S155: YES), this processing is ended.

In this embodiment, the volume configuration information required by each microprocessor package 120 is stored in the package memory 122 within each microprocessor package 120, and, in a predetermined case, the volume configuration information is rearranged. Therefore, the performance, reliability and usability of the storage control apparatus 10 can be enhanced.

In the present embodiment, the volume configuration information can be rearranged to an appropriate place without stopping the access from the host 30, whereby the usability is improved.

In the present embodiment, the attribute of each microprocessor 121 is sorted into the attribute for the command processing (synchronous processing attribute), and the attribute for performing processing different from the command processing (rearranging the volume configuration information, diagnosis processing, destage processing, etc.) (asynchronous processing attribute). Furthermore, in the present embodiment, the attribute of each microprocessor 121 can be dynamically changed in accordance with the state of the load of the microprocessor package 120. Therefore, in the present embodiment each microprocessor package 120 can be provided with an appropriate processing performance in accordance with the state of the load of the microprocessor package 120.

Embodiment 2

The second embodiment is described with reference to FIGS. 27 and 28. This present corresponds to a modification of the first embodiment. Therefore, this embodiment describes mainly the difference with the first embodiment. This embodiment describes a method of treating the unprocessed command accepted before the I/O allocation table T10 is updated, when the host 30 is the mainframe (MF).

Figure 27:
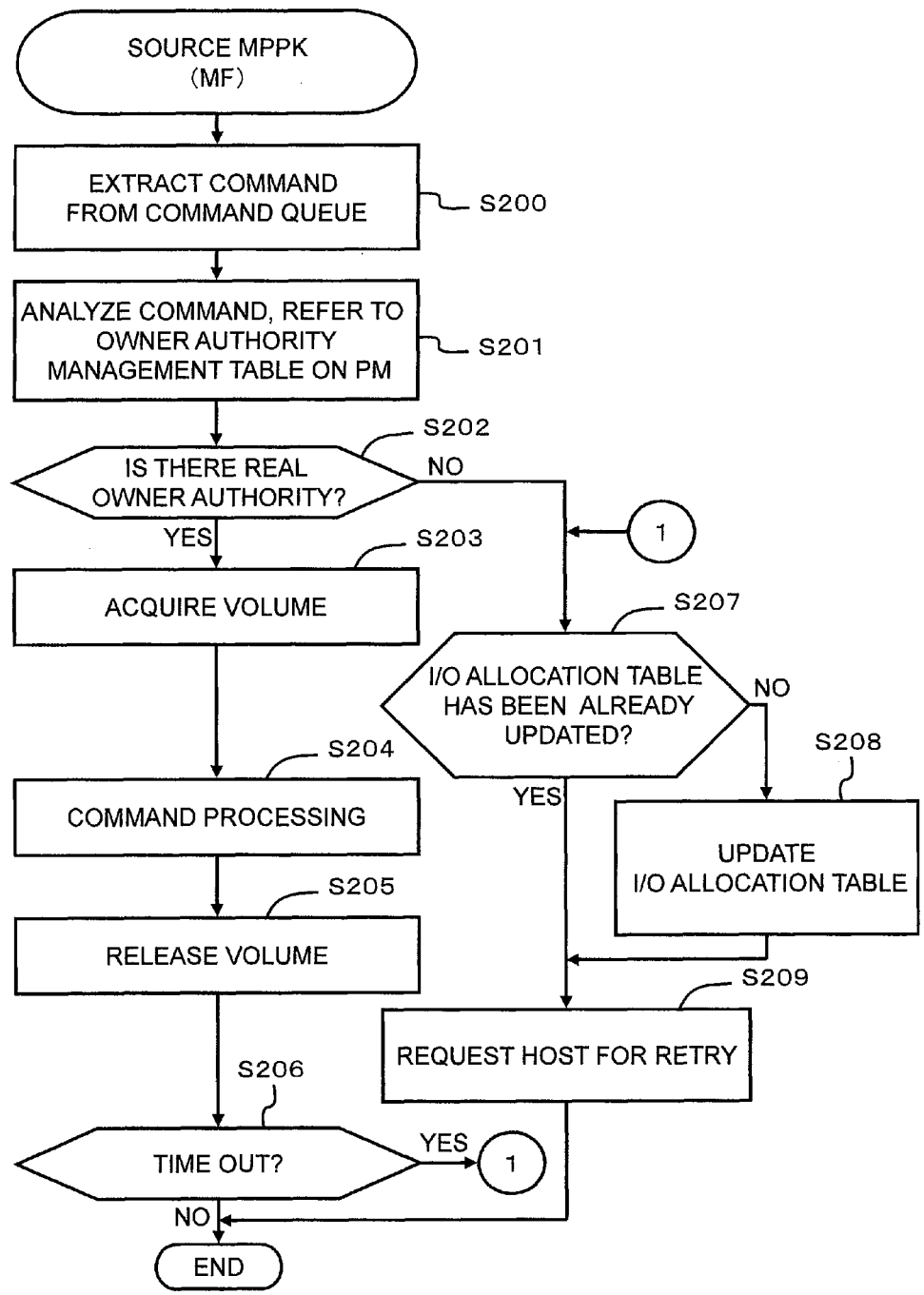
FIG. 27 A flowchart showing processing of the source microprocessor package, according to a second embodiment, which is performed when the source microprocessor package is a mainframe microprocessor package.

FIG. 27 is a flowchart showing the processing executed by the source microprocessor package 120. This processing corresponds to the processing performed when the host 30 is the open system host shown in FIG. 18.

The microprocessor 121 extracts the unprocessed commands from the command queue Q21 (S200). The microprocessor 121 analyzes the commands and refers to the owner authority management table T21 on the package memory 122 (S201).

The microprocessor 121 determines whether this command has the real owner authority of the logical volume 152 used for the command processing (S202). When the command has the real owner authority (S202: YES), the microprocessor 121 secures the logical volume 152 used for the command processing (S203), processes the command (S204), and releases the logical volume 152 (S205).

The microprocessor 121 then determines whether a predetermined time period elapses (S206). Specifically, the microprocessor 121 determines whether the time expires or not. When the predetermined time period has not yet elapsed (S206: NO), this processing is ended. The microprocessor 121 extracts another command from the command queue Q21 and repeats the abovementioned steps.

When the predetermined time period elapses (S206: YES), the microprocessor 121 moves to step S207 to confirm whether or not the I/O allocation table T10 is updated. When the I/O allocation table T10 is not updated (S207: NO), the microprocessor 121 updates the I/O allocation table T10 (S208). In other words, the precedent owner authority of the logical volume 152 used for the command processing is changed to the destination microprocessor package 120.

When the I/O allocation table T10 is updated (S207: YES), the microprocessor 121 requests the host 30, the mainframe, for retry (S209). Consequently, the host 30 issues a command again. The reissued command is transferred to the destination microprocessor package 120 by the communication port package 110.

The predetermined time period for forcibly moving the owner authority (S206) can be defined as, for example, the time elapsed since the precedent owner authority of the logical volume 152 used for the command processing was moved to the destination microprocessor package 120. Specifically, the predetermined time period can be set as the time period that has elapsed since the start of the update of the owner authority management table T21 within the package memory 122.

Figure 28:
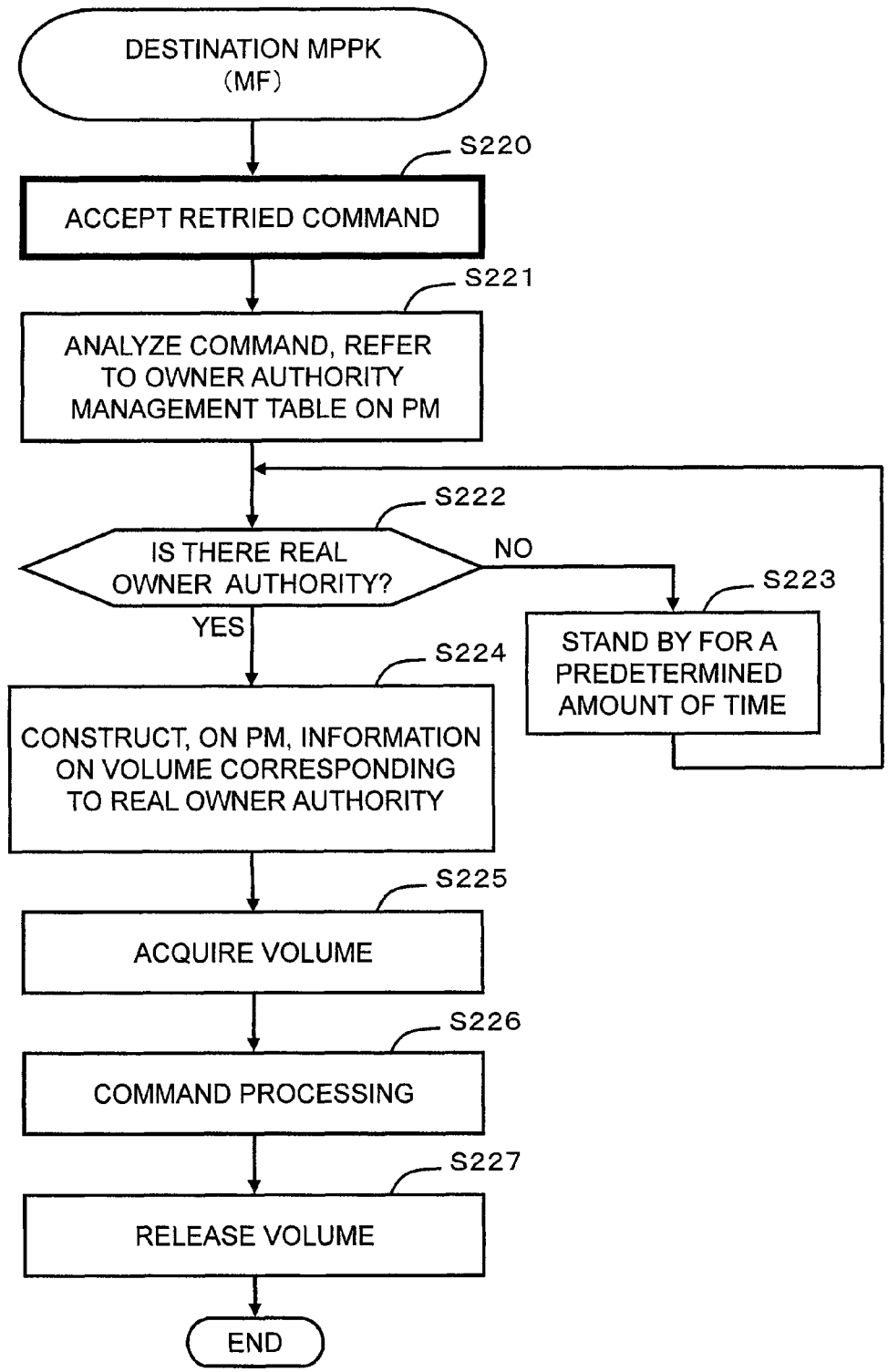
FIG. 28 A flowchart showing processing of the destination microprocessor that is performed when the destination microprocessor package is the mainframe microprocessor package.

FIG. 28 is a flowchart showing the processing executed by the destination microprocessor package 120. This processing corresponds to the processing shown in FIG. 20. The destination microprocessor 121 accepts the commands (the new command and the reissued command) issued by the host 30, which is the mainframe (S220). In this embodiment, the commands are not transferred from the source microprocessor package 120 to the destination microprocessor package 120. The accepted commands are registered in the command queue Q21.

The destination microprocessor 121 analyzes the accepted commands and refers to the owner authority management table T21 within the package memory 122 (S221). The destination microprocessor 121 determines whether or not the real owner authority of the logical volume 152 used for processing the commands is possessed (S222).

When the destination microprocessor package 120 does not have the real owner authority relating to the target logical volume 152 (S222: NO), the destination microprocessor 121 stands by for a predetermined time period (S223).

When the destination microprocessor package acquires the real owner authority (S222: YES), the destination microprocessor 121 constructs the management information for the target logical volume 152 in the package memory 122 (S224). Specifically, based on the information acquired from the shared memory 131, the destination microprocessor 121 constructs, within the package memory 122, the volume configuration information T20 and the cache management table T22 relating to the target logical volume 152.

The destination microprocessor 121 secures the target logical volume 152 (S225), processes the commands using this logical volume 152 (S226), and releases this logical volume 152 after the completion of the command processing (S227).

The present embodiment that is configured as described above achieves the same effects as the first embodiment. Moreover, according to the present embodiment, the volume configuration information can be moved in accordance with the difference between the technical property of the open system host and the technical property of the mainframe, whereby the usability of the storage control apparatus 10 can be improved.

In the case of the open system host, because the command size thereof is relatively small, the source microprocessor package transfers the received commands to the destination microprocessor package after the precedent owner authority is lost.

In the case of the mainframe, on the other hand, a plurality of commands are connected in a chain shape and the command size is relatively large. Therefore, the source microprocessor package continuously processes the received commands even after the precedent owner authority is lost. However, after a lapse of the predetermined time period, the processing of the received commands is stopped, and a request for reissuance of the commands is sent to the host 30 (mainframe), in order to complete the movement of the volume configuration information within the predetermined time period.

Note that the present invention is not limited to the embodiments described above. Those skilled in the art will appreciate that various additions and modifications can be performed within the scope of the present invention. For example, the embodiments described above may be combined appropriately.

The invention claimed is:

1. A storage control apparatus for controlling data input/output between a host computer and a storage unit, comprising:
   a first communication part for communicating with the host computer and storing an allocation table for allocating commands issued by the host computer;
   a second communication part for communicating with the storage unit on which a plurality of logical volumes are managed;
   a plurality of microprocessors for controlling the data input/output between the host computer and the storage unit by using the first communication part and the second communication part;
   a shared memory used by each of the microprocessors; and
   a plurality of local memories arranged for the microprocessors respectively,
   wherein a first microprocessor of the microprocessors: corresponds to an use authority of a first logical volume and a second logical volume; executes a process of a command relating to the first logical volume and a command relating to the second logical volume by referring to first configuration information and second configuration information stored in a first local memory, arranged for the first microprocessor, of the local memories, the first configuration information relating to the first logical volume, the second configuration information relating to the second logical volume,
   wherein a second microprocessor of the microprocessors: corresponds to an use authority of a third logical volume; executes a process of a command relating to the third logical volume by referring to third configuration information in a second local memory, arranged for the second microprocessor, of the local memories, the third configuration information relating to the third logical volume,
   wherein the shared memory stores the first configuration information, the second configuration information and the third configuration information,
   wherein when a predetermined condition is satisfied:
      the use authority of the first logical volume is moved from the first microprocessor to the second microprocessor; the first configuration information stored in the first local memory is deleted; and the first configuration information stored in the shared memory is copied to the second local memory, so that the second microprocessor executes a process of a command relating to the first logical volume by referring to the first configuration information in the second local memory.

2. The storage control apparatus according to claim 1, wherein each of the microprocessors is contained in one of a plurality of microprocessor packages, each of which has a group of the microprocessors, in each of the microprocessor packages, a first one of the group of microprocessors is for processing the commands issued by the host computer, and a second one of the group of microprocessors is in charge of processing different from the command processing, the microprocessors contained in a respective microprocessor package share the local memories within the microprocessor package, the shared memory stores, beforehand, first use authority information representing an use authority for each of the logical volumes, in the first use authority information, reception authority information representing authority to receive the commands relating to the logical volumes and execution authority information representing authority to process the commands using the logical volumes are associated with each other for each of the logical volumes beforehand, each of the local memories stores second use authority information, which is a copy of the first use authority information, the allocation table stores a copy of the reception authority information, from among the first use authority information, which relates to each of the logical volumes, (1) when the predetermined condition is established, the second microprocessor within a respective one of the microprocessor packages:

(1-1) switches the reception authority information relating to a movement target logical volume out of the reception authority information stored in the allocation table, from a microprocessor package serving as a movement source to a microprocessor package serving as a movement destination, in order to update the allocation table;

(1-2) switches the reception authority information, of the first use authority information, that relates to the movement target logical volume, from the microprocessor package serving as the movement source to one of the microprocessor packages serving as a movement destination, in order to update the first use authority information; and (1-3) conforms the second use authority information to the updated first use authority information, (2) a first communication controller transmits the commands issued by the host computer to the microprocessor package serving as the movement destination based on the updated allocation table, (3) the microprocessor package serving as the movement source:

(3-1) transfers a command extracted from a queue for accumulating unprocessed commands to the microprocessor package serving as the movement destination when the reception authority information is already moved to the microprocessor package serving as the movement destination;

(3-2) moves the execution authority information to the microprocessor package serving as the movement destination when all of commands in process are lost; and (3-3) deletes the configuration information corresponding to the movement target logical volume from the local memories within the microprocessor package serving as the movement source, (4) the microprocessor package serving as the movement destination:

(4-1) accumulates commands to be received from the first communication part or from the microprocessor package serving as the movement source as commands to be processed, until the execution authority information is acquired from the microprocessor package serving as the movement source;

(4-2) stores the configuration information relating to the movement target logical volume, into the local memories on the basis of the configuration information within the shared memory, when the execution authority information is acquired from the microprocessor package serving as the movement source; and (4-3) processes the commands to be processed, by using the configuration information in the local memories, and (5) in a case in which the host computer corresponding to the microprocessor package serving as the movement source is a mainframe:

(5-1) either when the execution authority information is already moved to the microprocessor package serving as the movement destination or when a predetermined time period that is set for moving the execution authority information to the microprocessor package serving as the movement destination elapses; and (5-2) processing of the command extracted from the queue for accumulating the unprocessed commands is suspended, and a request for reissuance of this process-suspend command is sent to the host computer.

3. The storage control apparatus according to claim 1, wherein use authority information representing authority to use each of the logical volumes is stored in each of the local memories beforehand, in the use authority information, reception authority information representing authority to receive the commands relating to the logical volumes and the execution authority information representing the authority to process the commands using the logical volumes are associated with each other for each of the logical volumes beforehand, when the predetermined condition is satisfied, first, the reception authority information relating to the movement target logical volume is associated with a microprocessor serving as a movement destination, and then the execution authority information relating to the movement target logical volume is associated with the microprocessor serving as the movement destination, whereby the configuration information relating to the movement target logical volume is moved to the local memory used by the microprocessor serving as the movement destination.

4. The storage control apparatus according to claim 1, wherein the shared memory stores, beforehand, first use authority information representing authority to use each of the logical volumes, in the first use authority information, reception authority information representing authority to receive the commands relating to the logical volumes and execution authority information representing authority to process the commands using the logical volumes are associated with each other for each of the logical volumes beforehand, each of the local memories stores second use authority information, which is a copy of the first use authority information, the allocation table stores a copy of the reception authority information, from among the first use authority information, which relates to each of the logical volumes, (1) when the predetermined condition is established, a predetermined microprocessor of the microprocessors:

(1-1) switches the reception authority information relating to the movement target logical volume out of the reception authority information stored in the allocation table, from one of the microprocessors serving as a movement source to one of the microprocessors serving as a movement destination, in order to update the allocation table;

(1-2) in the first use authority information, switches the reception authority information relating to the movement target logical volume, from the microprocessor serving as the movement source to the microprocessor serving as the movement destination, in order to update the first use authority information; and (1-3) conforms the second use authority information to the updated first use authority information, (2) a first communication controller transmits the commands issued by the host computer to the microprocessor serving as the movement destination based on the updated allocation table, (3) the microprocessor serving as the movement source:

(3-1) transfers unprocessed commands to the microprocessor serving as the movement destination when the reception authority information is already moved to the microprocessor serving as the movement destination;

(3-2) moves the execution authority information to the microprocessor serving as the movement destination when all of commands in process are lost; and (3-3) deletes configuration information corresponding to the movement target logical volume from the local memory used by the microprocessor serving as the movement source, (4) the microprocessor serving as the movement destination:

(4-1) accumulates commands to be received from the first communication part or the microprocessor serving as the movement source, until the execution authority information is acquired from the microprocessor as a source;

(4-2) stores the configuration information relating to the movement target logical volume, into the local memories on the basis of the configuration information within the shared memory, when the execution authority information is acquired from the microprocessor serving as the movement source; and (4-3) processes the commands to be processed, by using the configuration information stored in the local memories.

5. The storage control apparatus according to claim 4, wherein (5) in a case in which the host computer corresponding to the microprocessor serving as the movement source is a mainframe:

(5-1) either when the execution authority information is already moved to the microprocessor serving as the movement destination or when a predetermined time period that is set for moving the execution authority information to the microprocessor serving as the movement destination elapses, (5-2) the microprocessor serving as the movement source receives the reception authority information prior to the movement thereof to the microprocessor serving as the movement destination, suspends the processing of the unprocessed commands, and requests the host computer to reissue the process-suspended commands.

6. The storage control apparatus according to claim 1, wherein each of the microprocessors is contained in one of a plurality of microprocessor packages, each of which has a group of the microprocessors, in each of the microprocessor packages, a first one of the group of microprocessors is for processing the commands issued by the host computer, and a second one of the group of microprocessors is in charge of processing different from the processing of the commands, the microprocessors contained in the common microprocessor package share the local memories within the microprocessor package, and the second one of the group of microprocessors within a predetermined microprocessor package moves the second volume configuration information stored in the local memory serving as a movement source to the local memory serving as a movement destination, when the predetermined condition is satisfied.

7. The storage control apparatus according to claim 6, wherein the number of a type of microprocessors corresponding to the first one of the group of microprocessors is increased in accordance with the number of commands to be processed.

8. The storage control apparatus according to claim 7, wherein when the number of the type of the first one of the group of microprocessors reaches a predetermined upper limit value, the second one of the group of microprocessors is changed to a third microprocessor capable of performing both the command processing and different processing.

9. The storage control apparatus according to claim 1, wherein a case where the predetermined condition is satisfied means at least one of: when a copy pair is generated; when a failure occurs in any of the microprocessors; and when load is distributed among the microprocessors.

10. The storage control apparatus according to claim 1, wherein a case where the predetermined condition is satisfied means that a copy pair is generated using any plurality of the logical volumes, and the respective configuration information is moved from the local memory corresponding to one logical volume of the copy pair to the local memory corresponding to the other logical volume of the copy pair, such that the configuration information relating to the one logical volume and the configuration information relating to the other logical volume exist within the same local memory.

11. The storage control apparatus according to claim 1, wherein a case where the predetermined condition is satisfied means that a failure occurs in any of the microprocessors, and respective configuration information relating to the logical volume managed by the microprocessor having the failure is moved to the local memory associated with the microprocessor for performing processing on behalf of the microprocessor, having the failure.

12. The storage control apparatus according to claim 1, wherein a case where the predetermined condition is satisfied means that load is distributed among the microprocessors, and respective configuration information is moved from a high-load microprocessor having a load of at least a predetermined value to a low-load microprocessor having a load of less than the predetermined value.

13. A method of controlling a storage control apparatus controlling data input/output between a host computer and a storage unit, the storage control apparatus having
- a first communication part for communicating with the host computer and storing an allocation table for allocating commands issued by the host computer;
- a second communication part for communicating with the storage unit on which a plurality of logical volumes are managed;
- a plurality of microprocessors for controlling the data input/output between the host computer and the storage unit by using the first communication part and the second communication part;
- a shared memory used by each of the microprocessors; and
- a plurality of local memories arranged for the microprocessors respectively,
- where a first microprocessor of the microprocessors: corresponds to an use authority of a first logical volume and a second logical volume; executes a process of a command relating to the first logical volume and a command relating to the second logical volume by referring to first configuration information and second configuration information stored in a first local memory, arranged for the first microprocessor, of the local memories, the first configuration information relating to the first logical volume, the second configuration information relating to the second logical volume,
- where a second microprocessor of the microprocessors: corresponds to an use authority of a third logical volume; executes a process of a command relating to the third logical volume by referring to third configuration information in a second local memory, arranged for the second microprocessor, of the local memories, the third configuration information relating to the third logical volume,
- where the shared memory stores the first configuration information, the second configuration information and the third configuration information,
- each of the local memories further stores use authority information representing authority to use each of the logical volumes,
- in the use authority information, reception authority information representing authority to receive the commands relating to the logical volumes and execution authority information representing authority to process the commands using the logical volumes are associated with each other for each of the logical volumes beforehand, the method comprising:

determining whether a predetermined condition is satisfied or not;

when the predetermined condition is satisfied:

moving the use authority of the first logical volume from the first microprocessor to the second microprocessor;

deleting the first configuration information from the first local memory;

copying the first configuration information stored in the shared memory to the second local memory; and executing, by the second microprocessor, a process of a command relating the first volume by referring to the first configuration information in the second local memory.

\* \* \* \* \*